United States Patent
Murakami et al.

(10) Patent No.: US 12,416,776 B2
(45) Date of Patent: Sep. 16, 2025

(54) STEREO LENS APPARATUS AND IMAGE PICKUP APPARATUS

(71) Applicant: CANON KABUSHIKI KAISHA, Tokyo (JP)

(72) Inventors: Taro Murakami, Tokyo (JP); Hiroki Ito, Kanagawa (JP); Yosuke Fukai, Kanagawa (JP); Kiyoshi Nitto, Saitama (JP); Takumi Uehara, Kanagawa (JP); Atsuto Noda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 491 days.

(21) Appl. No.: 17/934,242

(22) Filed: Sep. 22, 2022

(65) Prior Publication Data
US 2023/0093930 A1 Mar. 30, 2023

(30) Foreign Application Priority Data

Sep. 30, 2021 (JP) .................................. 2021-160381

(51) Int. Cl.
*G02B 7/02* (2021.01)
*G02B 7/14* (2021.01)
(Continued)

(52) U.S. Cl.
CPC ............. *G02B 7/021* (2013.01); *G02B 7/025* (2013.01); *G02B 7/026* (2013.01); *G02B 7/14* (2013.01);
(Continued)

(58) Field of Classification Search
CPC .......... G02B 7/02; G02B 7/021; G02B 7/022; G02B 7/023; G02B 7/025; G02B 7/026;
(Continued)

(56) References Cited

U.S. PATENT DOCUMENTS

| | | | |
|---|---|---|---|
| 2013/0027792 A1* | 1/2013 | Miyamoto | G02B 7/023 359/826 |
| 2015/0181089 A1* | 6/2015 | Mirlay | H04N 13/204 348/46 |
| 2020/0132978 A1* | 4/2020 | Winterot | G02B 26/0816 |

FOREIGN PATENT DOCUMENTS

| | | |
|---|---|---|
| JP | H11149004 A | 6/1999 |
| JP | H11337801 A | 12/1999 |

(Continued)

OTHER PUBLICATIONS

The above foreign patent documents were cited in the Feb. 20, 2024 Japanese Office Action, which is enclosed without an English Translation, that issued in Japanese Patent Application No. 2021-160381.

*Primary Examiner* — Ephrem Z Mebrahtu
(74) *Attorney, Agent, or Firm* — Cowan, Liebowitz & Latman, P.C.

(57) ABSTRACT

A stereo lens apparatus includes two optical systems arranged in parallel. Each of the two optical systems includes, in order from an object side to an image side, first to third lens units. An optical path is bent at a position between the first and second lens units and at a position between the second and third lens units in each of the two optical systems so that an inter-optical axis distance between two third lens units is narrower than an inter-optical axis distance between two first lens units. Part of one holding mechanism of two holding mechanisms that are configured to respectively hold the two third lens units is located in a concave portion provided on the other holding mechanism, and part of the other holding mechanism is located in a convex portion provided on the one holding mechanism.

7 Claims, 21 Drawing Sheets

(51) Int. Cl.
*G03B 35/10* (2021.01)
*H04N 13/236* (2018.01)
*H04N 23/55* (2023.01)

(52) U.S. Cl.
CPC ........... *G03B 35/10* (2013.01); *H04N 13/236* (2018.05); *H04N 23/55* (2023.01)

(58) Field of Classification Search
CPC .... G02B 7/027; G02B 30/34; G02B 23/2415; G02B 7/14; G02B 3/14; G03B 35/10; H04N 13/204; H04N 13/232
See application file for complete search history.

(56) References Cited

FOREIGN PATENT DOCUMENTS

| | | | | |
|---|---|---|---|---|
| JP | 2013238792 A | | 11/2013 | |
| JP | 2014077305 A | | 5/2014 | |
| JP | 2014102363 A | | 6/2014 | |
| JP | 2020-008629 A | | 1/2020 | |
| JP | 2020154008 A | * | 9/2020 | ............ G02B 23/18 |
| JP | 2021051282 A | | 4/2021 | |
| WO | 2012017684 A | | 2/2012 | |

* cited by examiner

STEREO LENS APPARATUS AND IMAGE PICKUP APPARATUS

BACKGROUND OF THE INVENTION

Field of the Invention

The present disclosure relates to a lens apparatus suitable for capturing a stereoscopic image.

Description of the Related Art

As a stereo lens apparatus that enables acquisition of a stereoscopic image by imaging, a lens apparatus is used that includes two optical systems arranged in parallel so that parallax is provided. Japanese Patent Laid-Open No. ("JP") 2020-008629 discloses a stereo lens apparatus in which two optical systems (fisheye lenses) are arranged in parallel and two reflective members are provided in each optical system so that optical paths are bent. Bending the optical paths narrows a distance between image-side lens units in the two optical systems so that image circles of the two optical systems are formed on a single image sensor, while ensuring a base length between object-side lens units in the two optical systems.

In order that the lens apparatus disclosed in JP 2020-008629 is attached to a general lens-interchangeable type image pickup apparatus, the image side lens units of the two optical systems are made to be accommodated in a mount that is detachably attachable to the image pickup apparatus. Therefore, the distance between the image-side lens units is made to be as narrow as possible. However, if the distance between the image-side lens units is narrowed, it becomes difficult to dispose a holding mechanism that holds each image-side lens unit within the distance.

SUMMARY OF THE INVENTION

The present disclosure provides a stereo lens apparatus and an image pickup apparatus having the same each of which can include holding mechanisms that respectively hold image-side lens units within a distance between image-side lens units while the distance is narrowed.

A stereo lens apparatus according to one aspect of the embodiments of the present disclosure includes two optical systems arranged in parallel. Each of the two optical systems includes, in order from an object side to an image side, a first lens unit, a second lens unit, and a third lens unit. An optical path is bent at a position between the first lens unit and the second lens unit and at a position between the second lens unit and the third lens unit in each of the two optical systems so that an inter-optical axis distance between two third lens units of the two optical systems is narrower than an inter-optical axis distance between two first lens units of the two optical systems. Part of one holding mechanism of two holding mechanisms that are configured to respectively hold the two third lens units is located in a concave portion provided on the other holding mechanism, and part of the other holding mechanism is located in a convex portion provided on the one holding mechanism.

An image pickup apparatus according to one aspect of the embodiments of the present disclosure is an image pickup apparatus to which the stereo lens apparatus is detachably attachable. The image pickup apparatus includes a single image sensor configured to capture two optical images formed by the two optical systems.

A stereo image pickup apparatus according to one aspect of the embodiments of the present disclosure includes the stereo lens apparatus.

Further features of the present invention will become apparent from the following description of exemplary embodiments with reference to the attached drawings.

DESCRIPTION OF THE EMBODIMENTS

Referring now to the accompanying drawings, a description is given of embodiments according to the present disclosure.

First Embodiment

Figure 1:
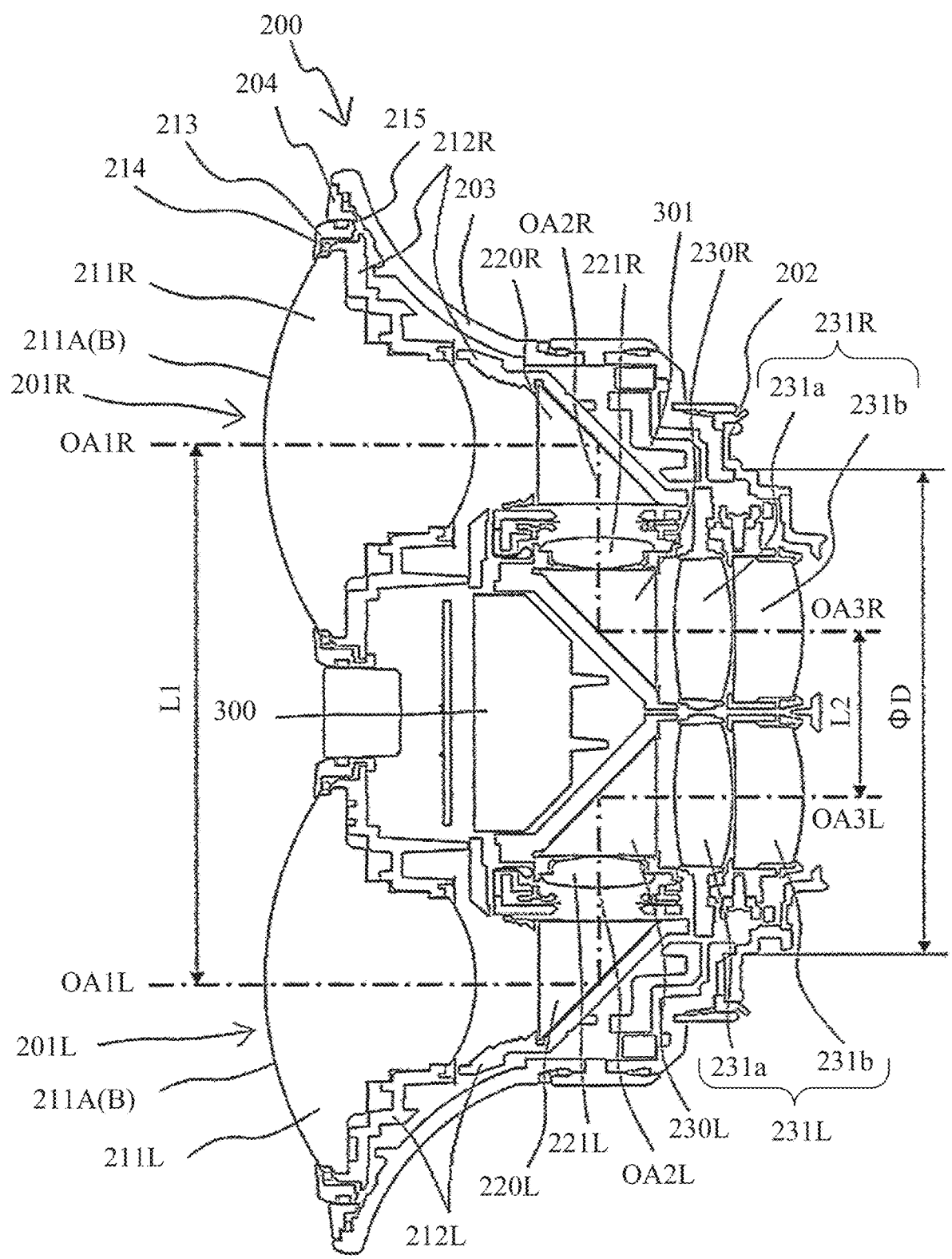
FIG. 1 is a sectional view of a stereo image pickup lens according to a first embodiment.
Figure 2:
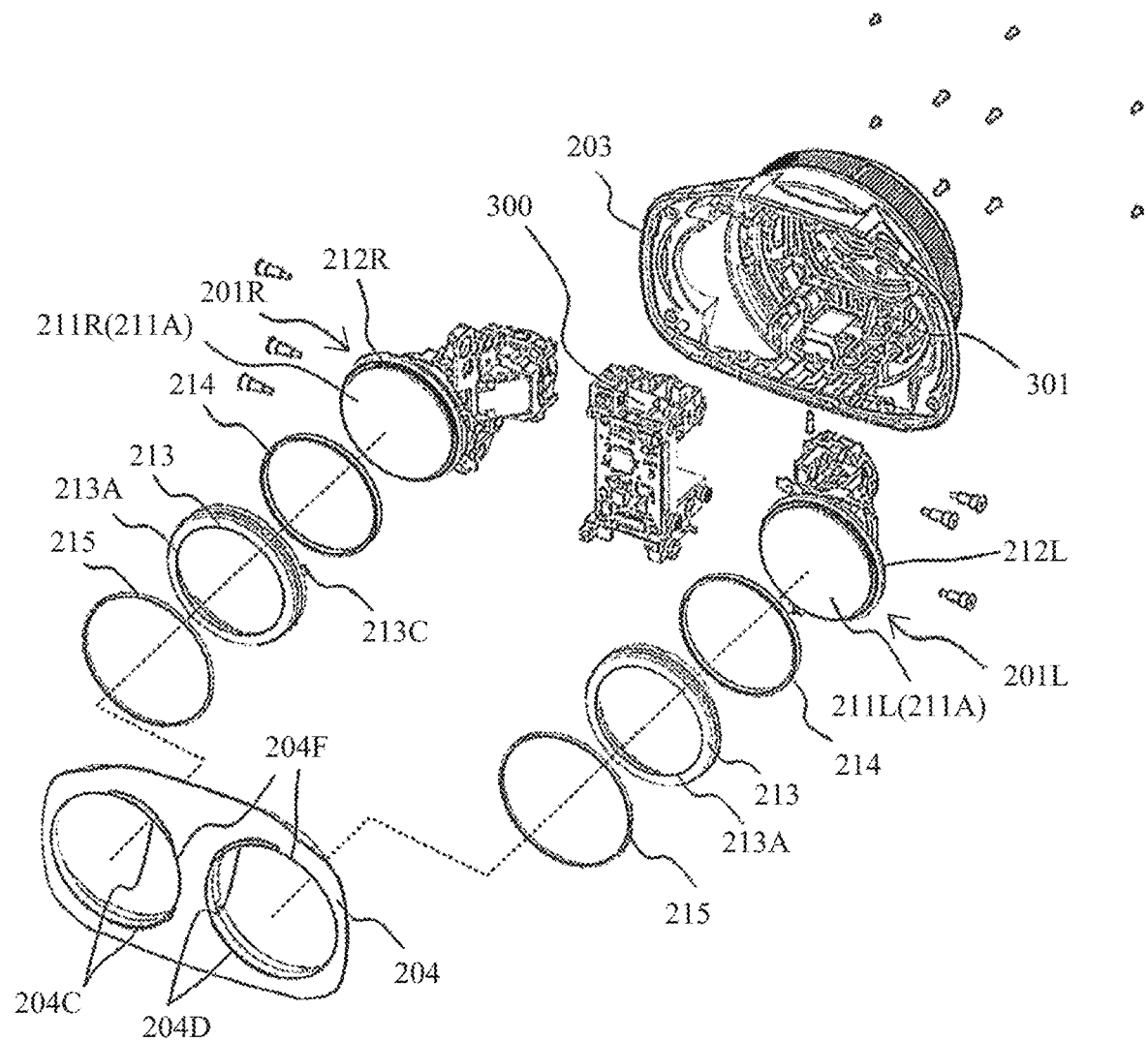
FIG. 2 is an exploded perspective view of the image pickup lens according to the first embodiment.
Figure 3:
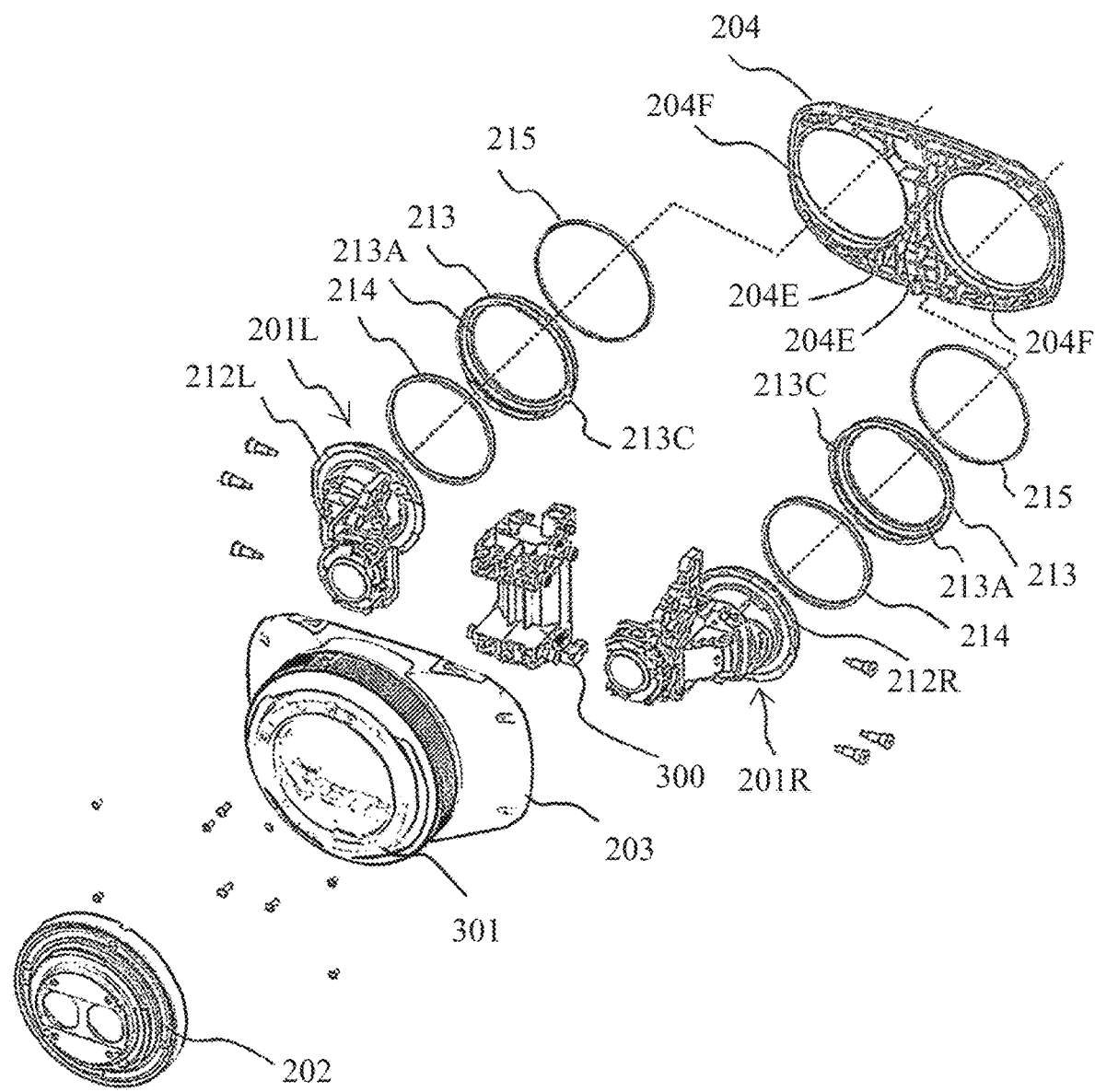
FIG. 3 is another exploded perspective view of the image pickup lens according to the first embodiment.

FIG. 1 illustrates a section of a stereo image pickup lens (hereinafter simply referred to as image pickup lens) 200 as a stereo lens apparatus according to a first embodiment of the present disclosure. FIGS. 2 and 3 are exploded views of the image pickup lens 200 viewed from an object side (front side) and an image side (rear side), respectively. The image pickup lens 200 is an interchangeable lens detachably attachable (interchangeable) to a lens-interchangeable type image pickup apparatus described below. However, the image pickup lens 200 may be provided in a lens-integrated image pickup apparatus and a stereo image pickup apparatus may be configured.

The image pickup lens 200 includes a right-eye optical system 201R as a first optical system and a left-eye optical system 201L as a second optical system. The right-eye optical system 201R and the left-eye optical system 201L are arranged in parallel in a left-right direction (vertical direction in the drawing of FIG. 1). However, the first optical system and the second optical system may be arranged in parallel in a vertical direction (depth direction in the drawing of FIG. 1). In the following description, R is added to an end of a reference numeral of each part of the right-eye optical system 201R, and L is added to an end of a reference numeral of each part of the left-eye optical system 201L.

The right-eye and left-eye optical systems 201R and 201L respectively include, in order from the object side to the image side, first lens units 211R and 211L, second lens units 221R and 221L, and third lens units 231R and 231L. Each lens unit includes one or more lenses.

The first lens units 211R and 211L have first optical axes OA1R and OA1L, respectively. The first optical axes OA1R and OA1L are separated from each other by an inter-optical axis distance L1 in the left-right direction. The distance L1 is also referred to as a base length. Each of the first lens units 211R and 211L includes, on the object side, a front lens surface 211A having a convex shape, so that each of the right-eye and left-eye optical systems 201R and 201L has an angle of view of 180° or more.

The second lens units 221R and 221L respectively have second optical axes OA2R and OA2L that extend in the left-right direction and are respectively orthogonal to the first optical axes OA1R and OA1L.

The third lens units 231R and 231L respectively have third optical axes OA3R and OA3L extending orthogonally to the second optical axes OA2R and OA2L (parallelly to the first optical axes OA1R and OA1L). Each third lens unit includes a front lens 231a and a rear lens 231b in order from the object side to the image side. The third optical axes OA3R and OA3L are separated from each other by a distance (narrow inter-optical axis distance) L2 that is shorter than the base length L1 in the left-right direction. In the following description, a direction in which the first optical axis OA1 (R, L) and the third optical axis OA3 (R, L) extend is referred to as an optical axis direction. A direction orthogonal to the optical axis direction (front-rear direction) is referred to as a radial direction, a direction orthogonal to the optical axis direction and the left-right direction is referred to as a vertical direction, and a direction around the first and third optical axes OA1 (R, L) and OA3 (R, L) is referred to as a circumferential direction.

First prisms 220R and 220L are respectively disposed between the first lens unit 211R and the second lens unit 221R and between the first lens unit 211L and the second lens unit 221L, and the first prisms 220R and 220L serve as reflective members that respectively bend optical paths of lights having been transmitted through the first lens units 211R and 211L toward the second lens units 221R and 221L. Second prisms 230R and 230L are respectively disposed between the second lens unit 221R and the third lens units 231R and between the second lens unit 221L and the third lens unit 231L, and the second prisms 230R and 230L serve as reflective members that respectively bend optical paths of lights having been transmitted through the second lens units 221R and 221L toward the third lens units 231R and 231L.

The right-eye and left-eye optical systems 201R and 201L are held respectively by lens holding members 212R and 212L, accommodated in an exterior cover member 203, and screwed and fixed to a lens top base 300. The lens top base 300 is screwed and fixed to a lens bottom base 301 disposed inside the exterior cover member 203. A straight guide portion provided on the exterior cover member 203 holds the lens bottom base 301 so that the lens bottom base 301 is movable in the optical axis direction while its rotation is restricted. As a result, the right-eye and left-eye optical systems 201R and 201L can perform focus adjustment by moving in the optical axis direction integrally with the lens top base 300 and the lens bottom base 301 (hereinafter also referred to as lens top/bottom bases 300 and 301). A lens mount 202 is screwed and fixed to a rear end of the exterior cover member 203.

A front surface exterior member 204 is fixed to a front end of the exterior cover member 203 by screwing or gluing. The front surface exterior member 204 has two openings 204F for exposing the front lens surfaces 211A of the first lens units 211R and 211L of the right-eye and left-eye optical systems 201R and 201L.

Figure 4:
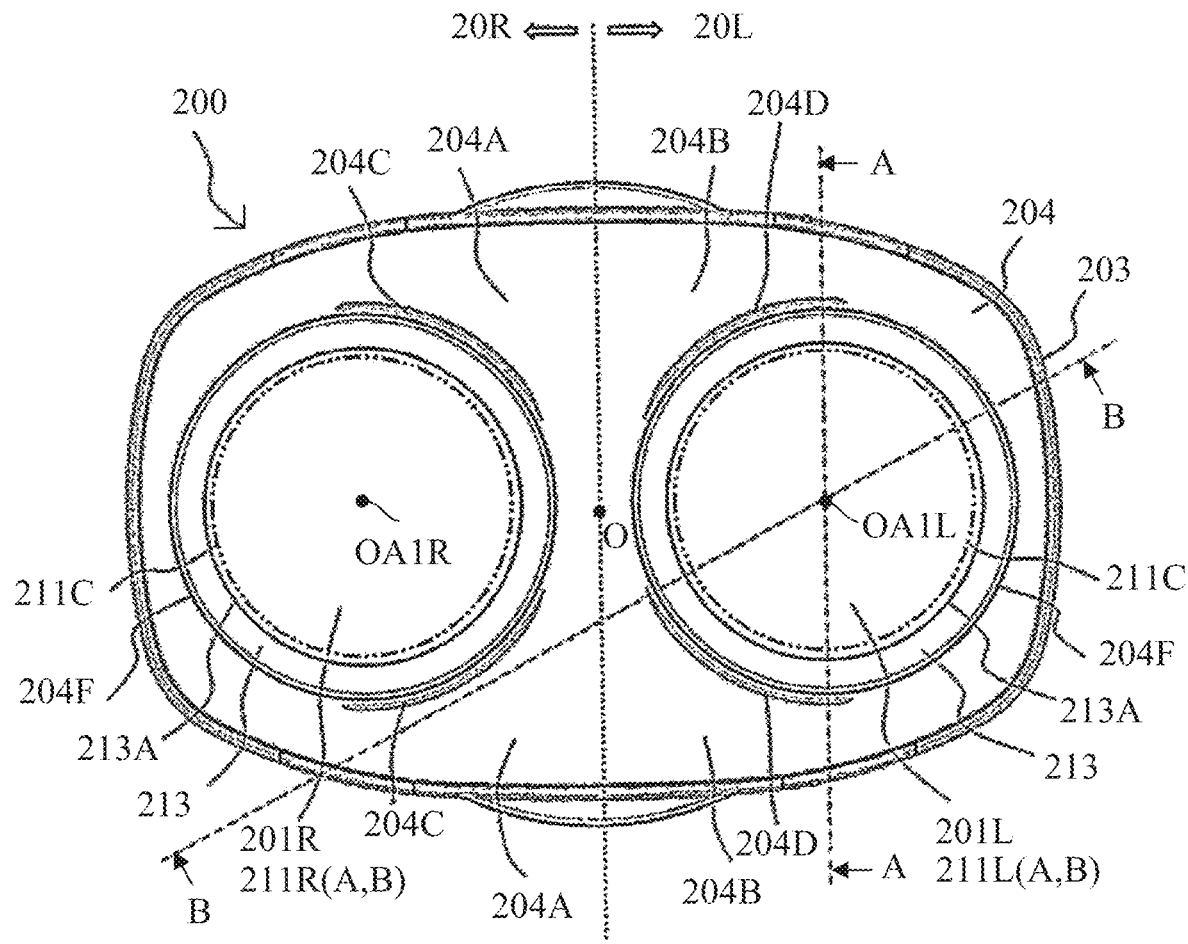
FIG. 4 is a front view of the image pickup lens according to the first embodiment.
Figure 7:
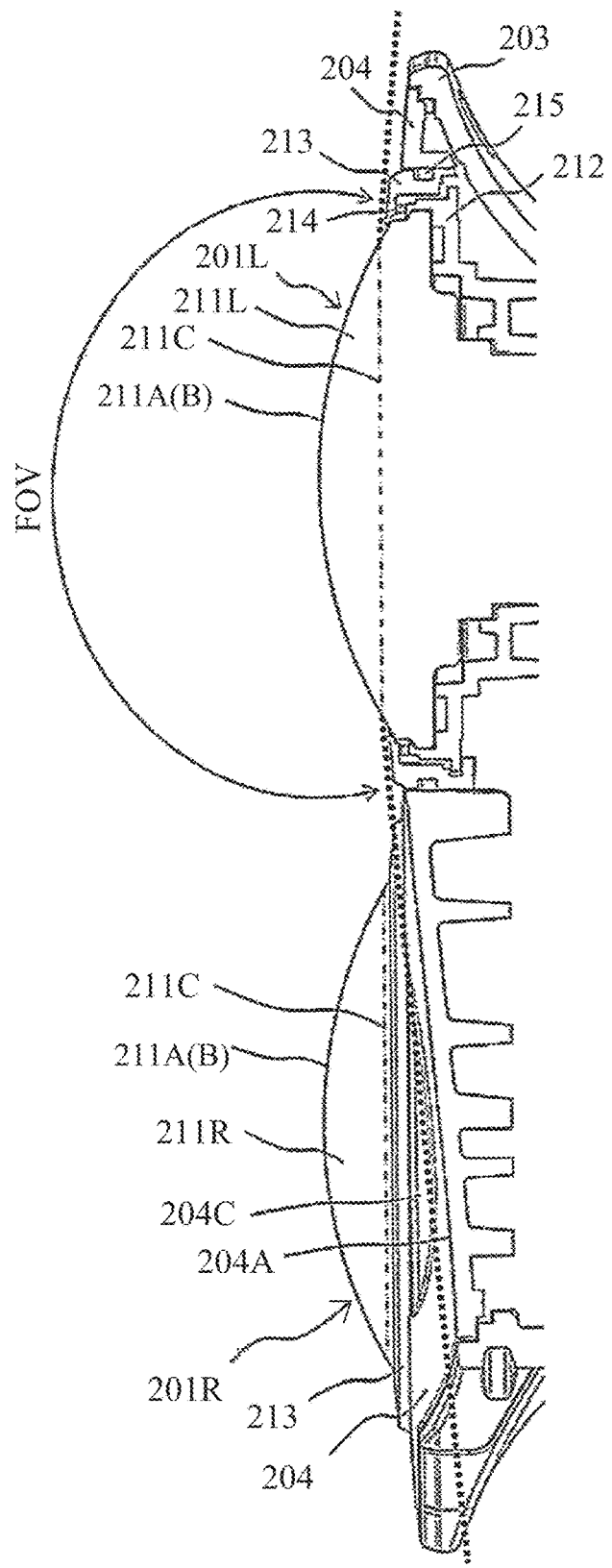
FIG. 7 is a sectional view along a line BB in FIG. 4.

FIG. 4 illustrates the image pickup lens 200 viewed from the object side. FIG. 7 illustrates a section along a line BB of the image pickup lens 200 illustrated in FIG. 4.

An effective light beam enters each of the right-eye optical system 201R and the left-eye optical system 201L from an angle of view of 180° or more. As illustrated in FIG. 4, an area on an inner side in the radial direction of an effective incident diameter 211C on the front lens surface 211A of each of the first lens units 211R and 211L is referred to as an effective incident surface 211B. A light beam from a direction of 180° of the angle of view enters the effective incident surface 211B from a direction orthogonal to the first optical axis OA1 (R, L). A light beam from a direction of more than 180° of the angle of view travels from the image side of the effective incident surface 211B toward the effective incident surface 211B. In order that the light beam from the direction of more than 180° of the angle of view is not blocked, a front surface of the front surface exterior member 204 is located on the image side of the effective incident surfaces 211B of the first lens units 211R and 211L as illustrated in FIG. 7. Similarly, front surfaces between the openings 204F and the first lens units 211R and 211L of cover members 213 are also located on the image side of the effective incident surfaces 2 outermost 11B.

Specifically, as illustrated in FIG. 4, the right side of a center point O between the right-eye optical system 201R and the left-eye optical system 201L is referred to as a right-eye area 20R, and a left side is the left side of the center point O is referred to as a left-eye area 20L. As illustrated in FIG. 7, in the right-eye area of the front surface exterior member 204, a right front surface 204A is formed that does not block an outermost effective light beam (thick dotted line in the drawing) entering the left-eye optical system 201L from a direction of 180° or more of the angle of view. Specifically, the right front surface 204A has a shape that becomes closer to the image side as a position on the right front surface 204A becomes more right side and farther from the first lens unit 211L of the left-eye optical system 201L.

Similarly, in the left-eye area 20L of the front surface exterior member 204, a left front surface 204B is formed that does not block an outermost effective light beam entering the right-eye optical system 201R from a direction of 180° or more of the angle of view. Specifically, the left front surface 204B has a shape that becomes closer to the image side as a position on the left front surface 204B becomes more left side and farther from the first lens unit 211R of the right-eye optical system 201R.

The right front surface 204A includes, on portions located in the vicinity of the opening 204F and on an upper side and a lower side of the center point O, wall portions 204C that protrude to the front side from the right front surface 204A and extend in arc shapes along the opening 204F. Similarly, the left front surface 204B includes, on portions located in the vicinity of the opening 204F and on an upper side and a lower side of the center point O, wall portions 204D that protrude to the front side from the left front surface 204B and extend in arc shapes along the opening 204F. The wall portions 204C do not block the effective light beam entering the right-eye optical system 201R, but block part of light beams heading the left-eye optical system 201L. The wall portions 204D do not block the effective light beam entering the left-eye optical system 201L, but block part of light beams heading the right-eye optical system 201R. As a result, as described below, images of the wall portions 204C are included in an image circle of the left-eye optical system 201L, and images of the wall portions 204D are included in the image circle of the right-eye optical system 201R.

Figure 5:
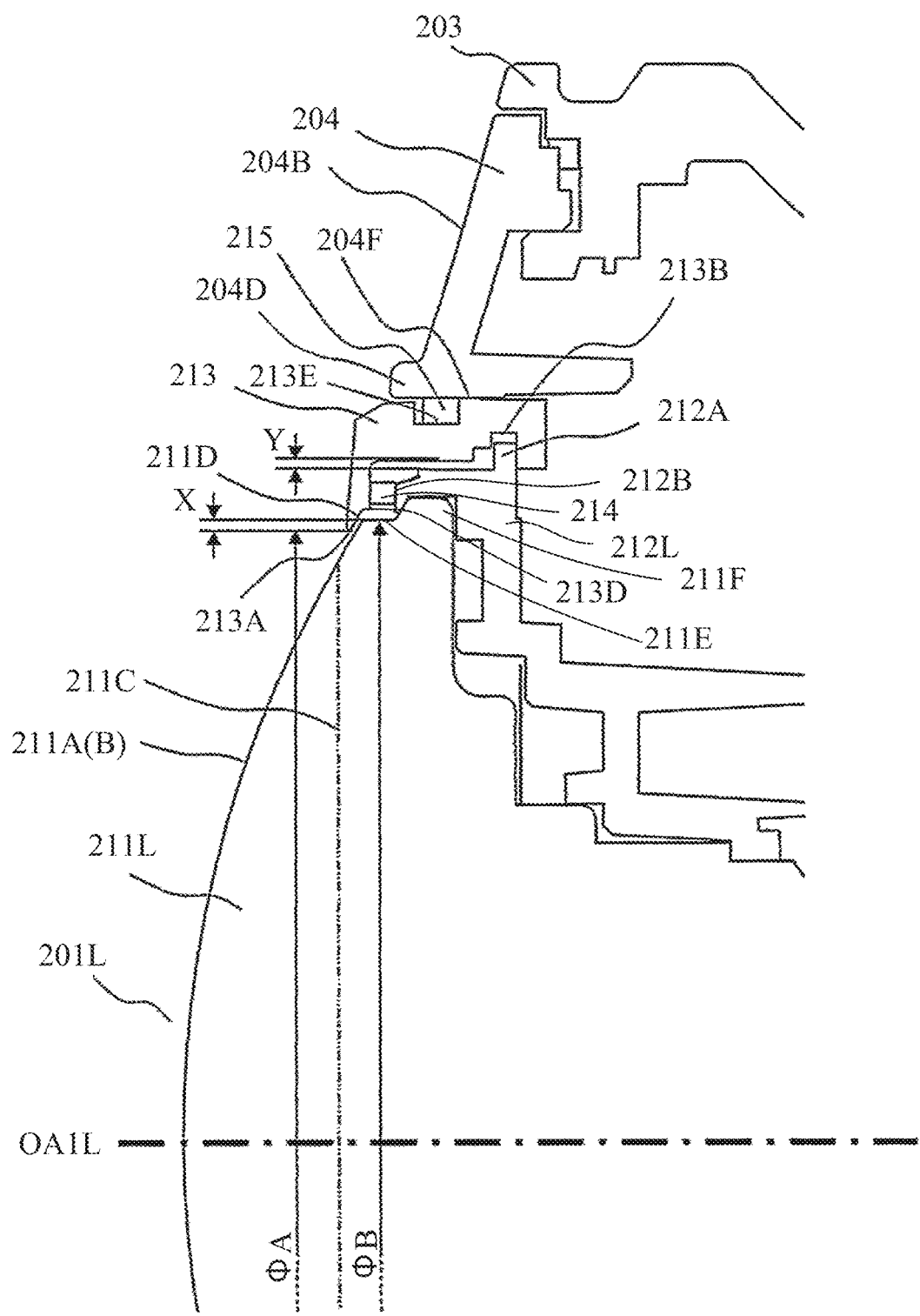
FIG. 5 is a sectional view along a line AA in FIG. 4.

FIG. 5 illustrates a section along a line AA of the vicinity of the first lens unit 211L of the left-eye optical system 201L in the image pickup lens 200 illustrated in FIG. 4. Here, a description is given of a holding structure of the first lens unit 211L of the left-eye optical system 201L, but the same applies to a holding structure of the first lens unit 211R of the right-eye optical system 201R.

A lens holding member 212L holds the first lens unit 211L, the second lens unit 221L, the third lens unit 231L, the first prism 220R, and the second prism 230R. The ring-shaped cover member 213 having an opening is attached to an outer circumference of the lens holding member 212L. A front end inner circumferential portion 213A surrounding the opening of the cover member 213 covers an outer edge 211D and its vicinity of the front lens surface 211A of the first lens unit 211L. That is, an inner diameter of the opening of the cover member 213 is smaller than a diameter of the outer edge 211D of the front lens surface 211A. The outer edge 211D of the front lens surface 211A is a boundary with a side surface 211E of the first lens unit 211L, and is on an outer side in the radial direction of the effective incident diameter 211C of the first lens unit 211 represented by a two-dot chain line.

On the rear side of the side surface 211E of the first lens unit 211L, a convex portion 211F is formed that projects outward in the radial direction from the side surface 211E. The lens holding member 212L holds the first lens unit 211 in the optical axis direction by sandwiching this convex portion 211F from the front and rear sides, and holds the first lens unit 211 in the radial direction by coming into contact with the outer circumferential surface of the convex portion 211F.

As described above, the cover member 213 attached to the outer circumference of the lens holding member 212L is fitted into the opening 204F of the left front surface 204B of the front surface exterior member 204, and thereby the lens holding member 212L holding the first lens unit 211L is held by the front surface exterior member 204 and is further held by the exterior cover member 203 to which the front surface exterior member 204 is fixed.

Figure 6:
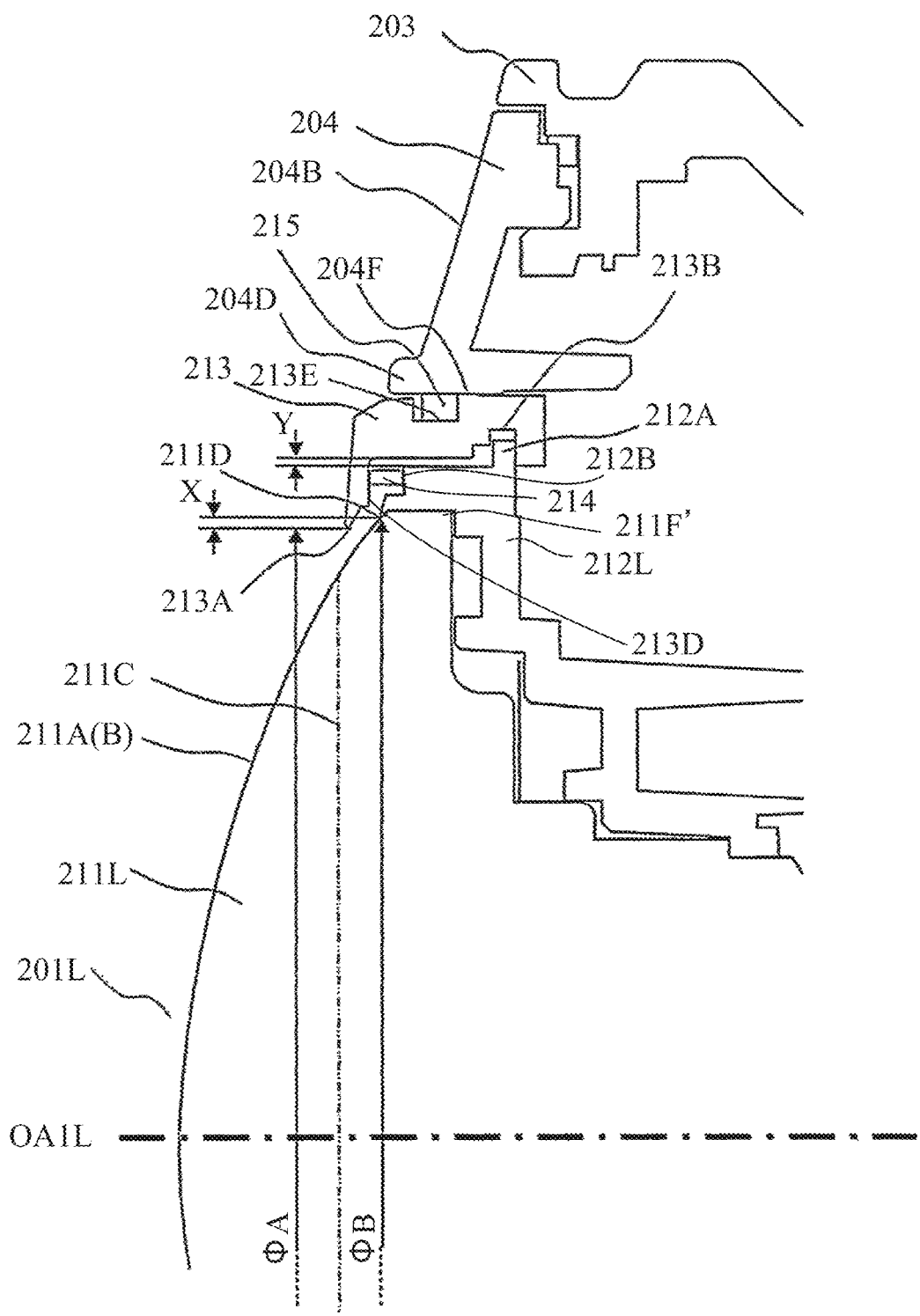
FIG. 6 is a sectional view along the line AA of an image pickup lens according to a modification example of the first embodiment.

FIG. 6 illustrates a modification example of FIG. 5. On the first lens unit 211L illustrated in FIG. 6, the side surface 211E of the first lens unit 211L illustrated in FIG. 5 is not formed, and only a convex portion 211F' is formed. That is, the convex portion 211F' is directly connected to the outer edge 211D of the front lens surface 211A. In FIG. 6, the lens holding member 212L holds the first lens unit 211 in the optical axis direction by sandwiching the convex portion 211F' from the front and rear sides, and holds the first lens unit 211 in the radial direction by coming into contact with the outer circumferential surface of the convex portion 211F'.

In FIGS. 5 and 6, the inner diameter of the opening (front end inner circumferential portion 213A) of the cover member 213 is $\Phi A$, and the diameter of the outer edge 211D of the front lens surface 211A is $\Phi B$. The following equation expresses an overlapping amount X that is an amount of the front end inner circumferential portion 213A covering a portion of the front lens surface 211A on the inner side of the outer edge 211D in the radial direction.

$$X=(\Phi B-\Phi A)/2$$

External appearance quality is improved by covering the outer edge 211D of the front lens surface 211A with the front end inner circumferential portion 213A of the cover member 213.

The cover member 213 is attached to the lens holding member 212L so that the cover member 213 is not displaced in the optical axis direction. Specifically, groove portions 213B extending in the circumferential direction are formed at a plurality of locations in the circumferential direction (direction around the optical axis) on an inner circumference of the cover member 213. These groove portions 213B engage with bayonet claw portions 212A provided at a plurality of locations in the circumferential direction on the outer circumference of the lens holding member 212L. During assembly, the cover member 213 is put on the lens holding member 212L so that the groove portions 213B and the bayonet claw portions 212A are located at phases different from each other in the circumferential direction. After that, when the cover member 213 is rotated in the circumferential direction, the bayonet claw portions 212A enter the groove portions 213B and engage with the groove portions 213B in the optical axis direction. Bayonet claw portions may be provided on the cover member 213, and groove portions may be provided on the lens holding member 212L.

On the other hand, the cover member 213 is attached so that the cover member 213 is displaceable by a gap Y in the radial direction relatively to the lens holding member 212L. The gap Y is smaller than the overlapping amount X of the cover member 213. Therefore, as illustrated in FIGS. 5 and 6, even when the lens holding member 212L is displaced away from the cover member 213 by the amount of the gap Y, a state is maintained in which the outer edge 211D of front lens surface 211A is covered with the front end inner circumferential portion 213A of the cover member 213.

An outer circumferential surface of the cover member 213 attached to the lens holding member 212L in this manner is fitted into an inner circumferential surface of the opening 204F of the front surface exterior member 204 so that the cover member 213 is movable in the optical axis direction. Thereby, the cover member 213 and the lens holding member 212L are held so that they are movable integrally with the front surface exterior member 204 in the optical axis direction. A fitting gap between the outer circumferential surface of the cover member 213 and the inner circumferential surface of the opening 204F is very small and smaller than the gap Y described above.

In this way, the lens holding member 212L is not directly fitted into the opening 204F of the front surface exterior member 204, but the cover member 213 that absorbs a backlash of the gap Y in the radial direction of the lens holding member 212L is fitted into the opening 204F. As a result, even when a manufacturing error causes a displacement of the position of the lens holding member 212L in the left-right direction, the position is not forcibly corrected. Therefore, the optical performance of each of the right-eye and left-eye optical systems 201R and 201L and the relative error of the right-eye and left-eye optical systems 201R and 201L are prevented from being changed when the front surface exterior member 204 is attached.

As illustrated in FIGS. 2 and 3, a rotation limiting key portion 213C is formed on the cover member 213. The rotation limiting key portion 213C engages with a rotation limiting groove portion 204E formed on the front surface exterior member 204 so that a rotation is limited of the cover member 213 in the circumferential direction. This prevents the cover member 213 attached to the lens holding member 212L from rotating and prevents the groove portions 213B and the bayonet claw portions 212A from disengaging. The cover member 213 may include a rotation limiting groove portion and the front surface exterior member 204 may include a rotation limiting key.

As illustrated in FIGS. 5 and 6, between a front inner surface 213D facing the image side of the cover member 213 and a front end surface 212B facing the object side of the lens holding member 212, a ring-shaped first sealing member 214 for drip-proof and dustproof is disposed in a state of being compressed and sandwiched. The first sealing member 214 includes an elastically deformable material such as rubber and sponge. An elastic force of the first sealing member 214 compressed between the front inner surface 213D and the front end surface 212B biases the cover member 213 and the lens holding member 212 in opposite directions in the optical axis direction. This can reduce a backlash in the optical axis direction between the cover member 213 and the lens holding member 212. Further, in a case where the lens holding member 212 is displaced relatively to the cover member 213 by the amount of the gap Y described above in the radial direction, the first sealing member 214 is elastically deformed following the displacement. This maintains the drip-proof and dustproof function and the function of biasing the cover member 213 and the lens holding member 212.

Between a bottom surface of a groove portion 213E provided on the outer circumference of the cover member 213 and an inner circumference surface of the opening 204F of the front surface exterior member 204, a second sealing member 215 for drip-proof and dustproof is disposed in a state of being sandwiched and compressed in the radial direction.

The image pickup lens 200 having the configuration described above has high external appearance quality, optical performance, and dustproof and drip-proof performance, and can perform imaging for acquiring a stereoscopic image (a right-eye image and a left-eye image as parallax images having parallax) at an angle of view of 180° or more. The stereoscopic image is observed by an observer as a VR image through VR goggles or the like.

Figure 8:
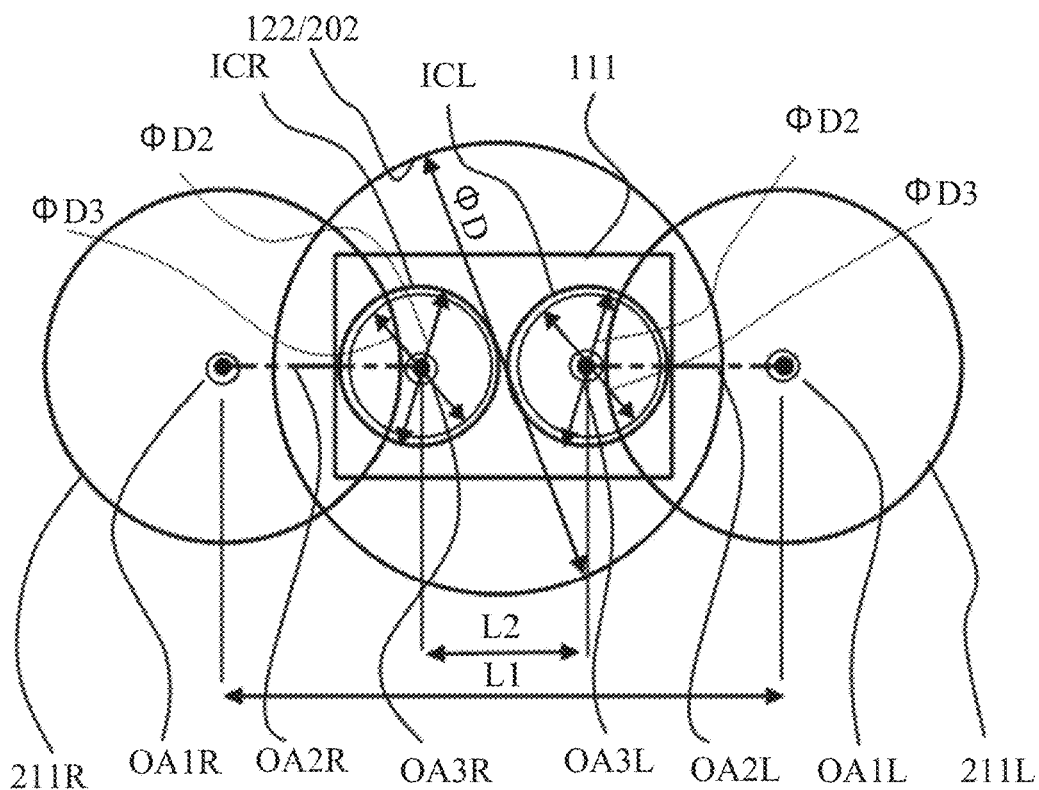
FIG. 8 is a diagram illustrating optical axes of the image pickup lens and image circles on an image sensor according to the first embodiment.

FIG. 8 illustrates a positional relation viewed from the optical axis direction between the first to third optical axes OA1R and OA1L to OA3R and OA3L of right-eye and left-eye optical systems 201R and 201L, the lens mount 202, and image circles ICR and ICL on a single image sensor 111 provided in the image pickup apparatus. 2.

On an image pickup plane of the image sensor 111, the image circle ICR of the right-eye optical system 201R (hereinafter referred to as a right image circle) and the image circle ICL of the left-eye optical system 201L (hereinafter referred to as a left image circle) are formed side by side in the left-right direction. A diameter ΦD2 of each image circle and a distance between the centers of the left and right image circles ICR and ICL are set to values such that the left and right image circles ICR and ICL do not overlap each other. For example, the image pickup plane of the image sensor 111 may be divided into left and right sides at the center, the center of the right image circle ICR may be located at the center of the right side of the image pickup plane, and the center of the left image circle ICL may be located at the center of the left side of the image pickup plane.

Each of the right-eye and left-eye optical systems 201R and 201L in this embodiment is configured as a circular fisheye lens that forms a circular image of an object included in the angle of view of 180° or more on the image pickup plane. Circular images are illustrated in the left and right image circles ICR and ICL in FIG. 8.

For example, a size of the image sensor (image pickup plane) 111 is set to 24 mm long×36 mm wide, the diameter ΦD2 of each image circle is set to Φ17 mm, the distance L2 between the third optical axes OA3R and OA3L is set to 18 mm, and a length of each of the second optical axes OA2R and OA2L is set to 21 mm. In this case, the base length L1 between the first optical axes OA1R and OA1L is 60 mm, which is almost equal to a distance between eyes of an adult. If the diameters of the third lens units 231R and 231L and the distance L2 between the third optical axes OA3R and OA3L are set to values such that the third lens units 231R and 231L are included inside the lens mount 202, the base length L1 can be made to be longer than the inner diameter ΦD of the lens mount 202. That is, a relationship between ΦD, L1, and L2 are expressed by the following inequality.

$$L1 > \Phi D > L2$$

In this embodiment, the angle of view is widened to at least 180° so that a more realistic VR image can be observed. A relationship between a diameter ΦD3 of an image circle of an angle of view of 180° and the diameter ΦD2 of the image circle of the maximum angle of view of more than 180° is expressed by the following inequality.

$$\Phi D2 > \Phi D3$$

Figure 9:
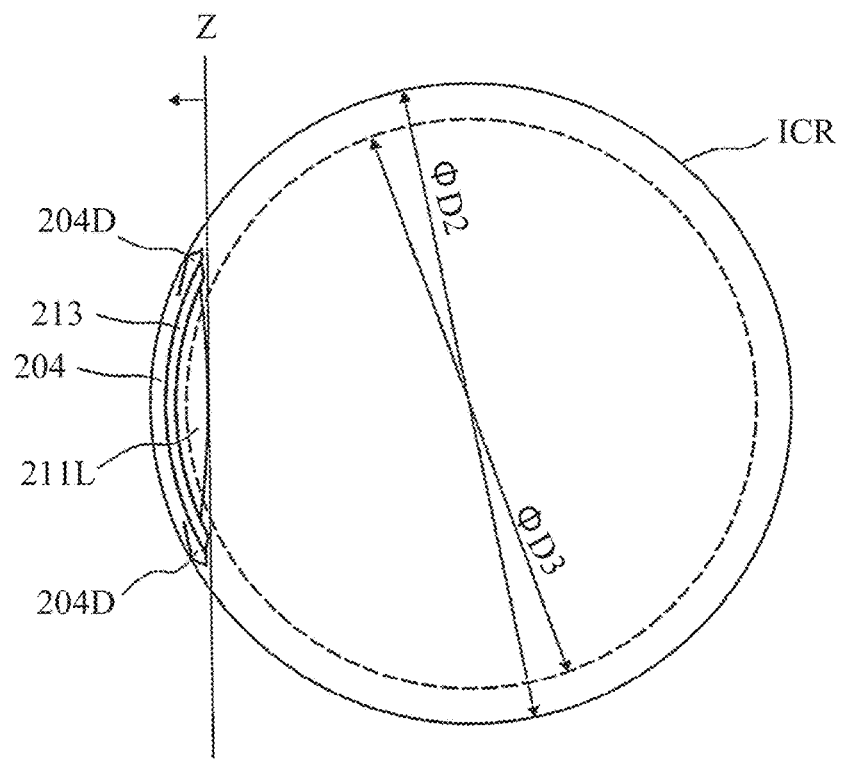
FIG. 9 is a diagram illustrating inclusion of one optical system in an image formed by the other optical system in the image pickup lens according to the first embodiment.

FIG. 9 illustrates inclusion of an image of the left-eye area 20L into the right image circle ICR. The right image circle ICR includes images of the first lens unit 211L of the left-eye optical system 201L, the cover member 213, the wall portions 204D of the front surface exterior member 204, and the vicinity thereof each of which is located in the left-eye area 20L. The images of the cover member 213, the wall portions 204D, and the vicinity thereof are included in the image circle ICR (diameter ΦD2) of the maximum angle of view, but are not included in the image circle (diameter ΦD3) of the angle of view of 180° and included on the outer side of this image circle. On the other hand, an image of the first lens unit 211L is also included in the image circle (diameter ΦD3) of the angle of view of 180°. Thus, the specifications of the image pickup lens 200 cause the inclusion of images of part of the left-eye area 20L into the right image circle ICR.

However, the images of the cover member 213, the wall portions 204D of the front surface exterior member 204, and the vicinity thereof are included in the image on an outer side of a vertex of the first lens unit 211L in the horizontal direction (the left side in FIG. 9). Therefore, of a captured image that is a circular image formed by the fisheye lens, the portion on the outer side of the vertex of the first lens unit 211L in the horizontal direction, that is, a small area on the left side of a straight line Z illustrated in FIG. 9 is trimmed (cut) in image processing or image editing. This can eliminate an effect on imaging and observation at an angle of view of more than 180°. The same applies to the inclusion of an image of the right-eye area 20R into the left image circle ICL.

Figure 10:
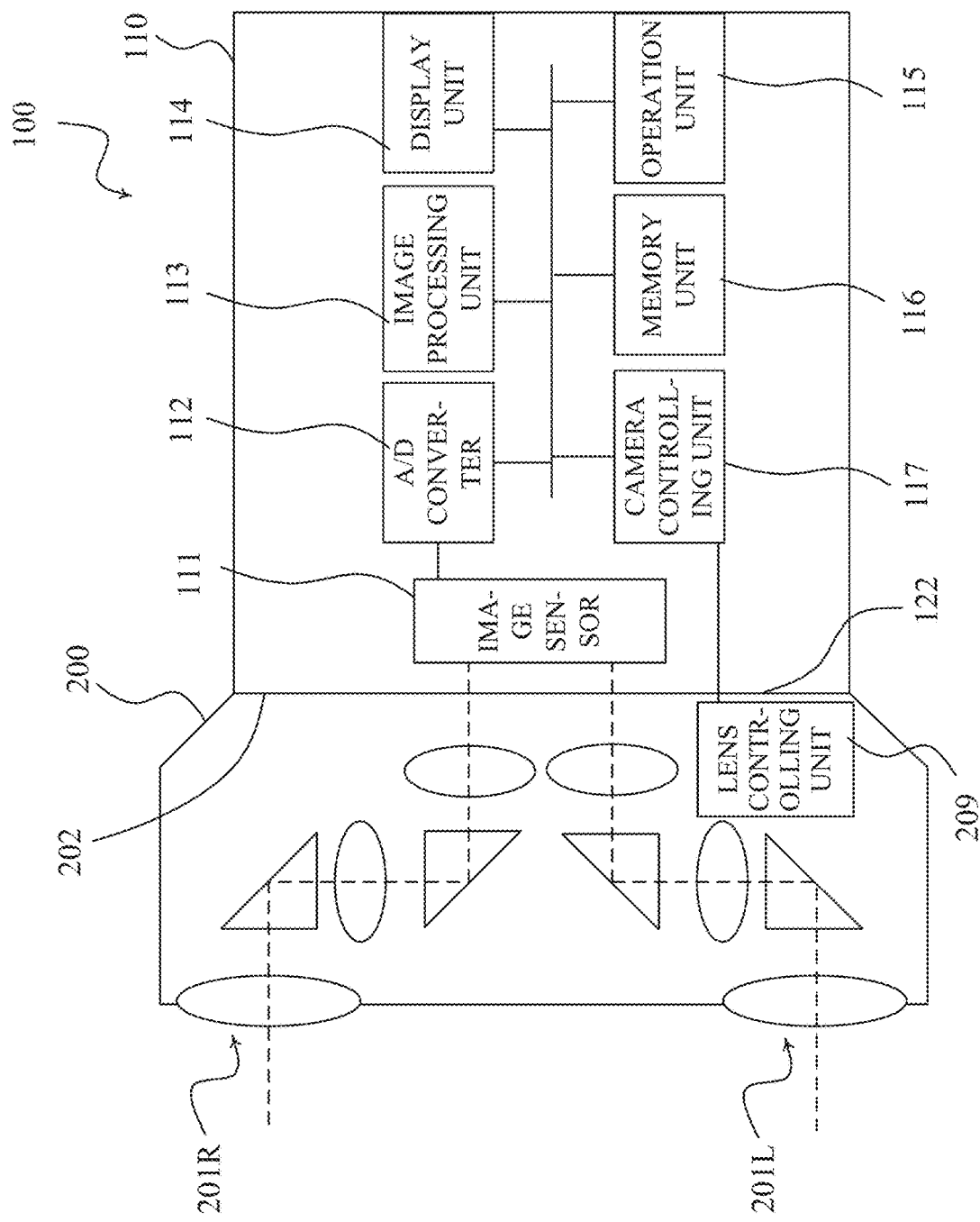
FIG. 10 is a diagram illustrating a camera to which the image pickup lens is attached according to the first embodiment.

FIG. 10 illustrates a stereo image pickup system 100 configured by attaching the image pickup lens 200 to a digital camera (hereinafter simply referred to as camera) 110 as a lens-interchangeable type image pickup apparatus. The image pickup lens 200 includes a lens controlling unit 209 in addition to the right-eye and left-eye optical systems 201R and 201L.

The camera 110 includes the image sensor 111, an A/D converter 112, an image processing unit 113, a display unit 114, an operation unit 115, a memory unit 116, a camera controlling unit 117, and a camera mount 122. If the lens mount 202 of the image pickup lens 200 is attached to the camera mount 122 of the camera 110, the camera controlling unit 117 and the lens controlling unit 209 are electrically connected, and they start communication.

The image sensor 111 is a single photoelectric conversion element, such as a CCD sensor and a CMOS sensor, that generates an analog electric signal by photoelectrically converting (images) a right-eye image (ICR) and a left-eye image (ICL), which are optical images respectively formed by the right-eye and left-eye optical systems 201R and 201L. The A/D converter 112 converts the analog electric signal output from the image sensor 111 into a digital signal. The image processing unit 113 generates image data by performing various image processing on the digital signal output from the A/D converter 112. The display unit 114 includes a display element such as a liquid crystal panel, and displays an image and various information depending on image data.

The operation unit 115 functions as an interface for a user to input various instructions. In a case where the display unit 114 includes a touch sensor, this touch sensor is also included in the operation unit 115. The memory unit 116 includes RAM, ROM, SSD, etc., and stores image data generated by the image processing unit 113, a program used by the camera controlling unit 117 as a computer for its operation, and various data.

The camera controlling unit 117 includes a CPU and the like, controls operation of the camera 110, and controls operation of the image pickup lens 200 through communication with the lens controlling unit 209.

Second Embodiment

Figure 11:
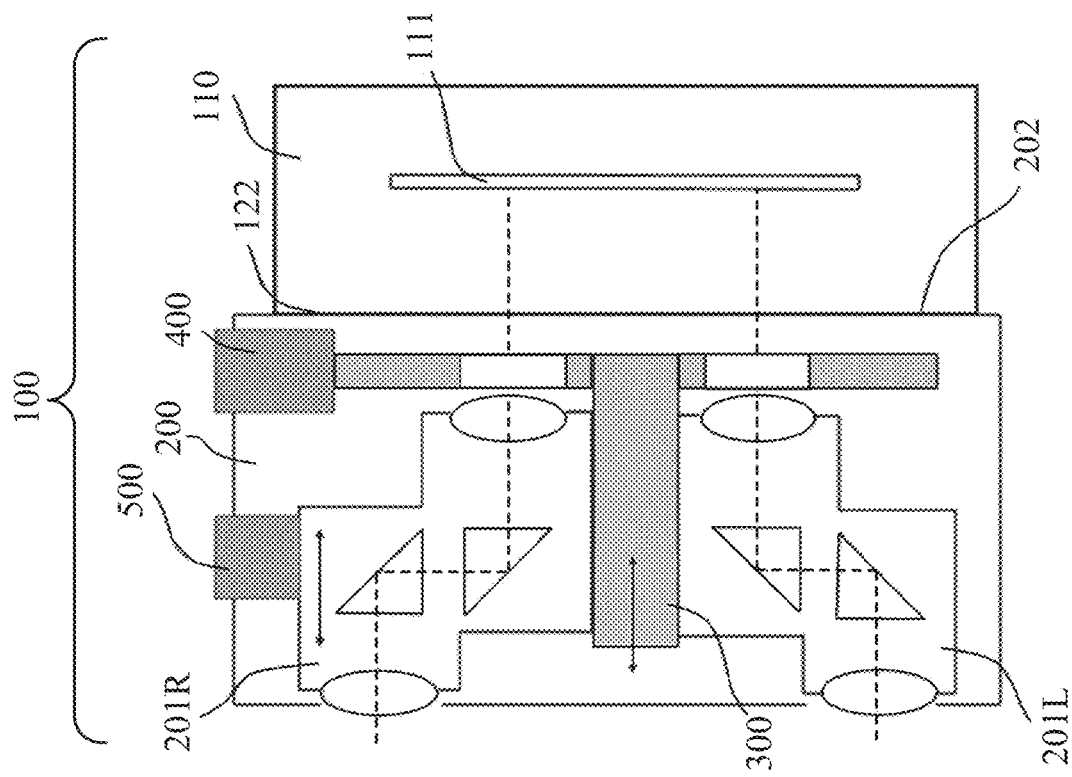
FIG. 11 is a diagram illustrating a configuration of a stereo image pickup lens according to a second embodiment.

Next, a description is given of a second embodiment of present disclosure. FIG. 11 illustrates a stereo image pickup system 100 including the same image pickup lens 200 as in the first embodiment and a camera 110 to which the image pickup lens 200 is detachably attached. Elements in this embodiment that are the same as elements in the first embodiment are denoted by the same reference numerals as those in the first embodiment.

As described in the first embodiment, the right-eye and left-eye optical systems 201R and 201L are attached to the lens top base 300. More specifically, the left-eye optical system 201L is fixed to the lens top base 300, and the right-eye optical system 201R is attached to the lens top base 300 so that the right-eye optical system 201R is movable in the optical axis direction. The lens top base 300 is fixed to the lens bottom base 301 and supported by the exterior cover member 203 together with the lens bottom base 301 so that the lens top base 300 and the lens bottom base 301 are movable in the optical axis direction. Therefore, by moving the lens top/bottom bases 300 and 301 in the optical axis direction, the right-eye and left-eye optical systems 201R and 201L can be moved together in the same direction. Focus adjustment on the image sensor 111 can be performed by moving the entire right-eye and left-eye optical systems 201R and 201L in the optical axis direction.

A description is given of a reason why focus adjustment is performed by moving the entire right-eye and left-eye optical systems 201R and 201L. When the focus is to be adjusted by moving some lenses included in each optical system, if the positions of these moving lenses are erroneously different from each other, the optical characteristics of the right-eye and left-eye optical systems 201R and 201L become different from each other. As a result, the focus state differs between the right-eye image and the left-eye image for stereoscopic viewing, which may cause discomfort in stereoscopic viewing. Therefore, by moving the entire right-eye and left-eye optical systems 201R and 201L, it is possible to prevent the optical characteristics of the right-eye and left-eye optical systems 201R and 201L from being different.

An outer circumference portion of a focus operating unit 400 is exposed outside the exterior cover member 203, and is rotationally operated in the circumferential direction by the user to move the right-eye and left-eye optical systems 201R and 201L (lens top/bottom bases 300, 301) in the optical axis direction. A detailed description is given later of the configuration for moving the right-eye and left-eye optical systems 201R and 201L in the optical axis direction by the user rotationally operating the focus operating unit 400.

As described in the first embodiment, the lens mount 202 of the image pickup lens 200 is attached to the camera mount 122 of the camera 110. Thus, in a case where the mount surface of the lens mount 202 is parallel to the image sensor (imaging surface) 111, the focus states of the right-eye and left-eye optical systems 201R and 201L on the image sensor 111 match each other.

Figure 12:
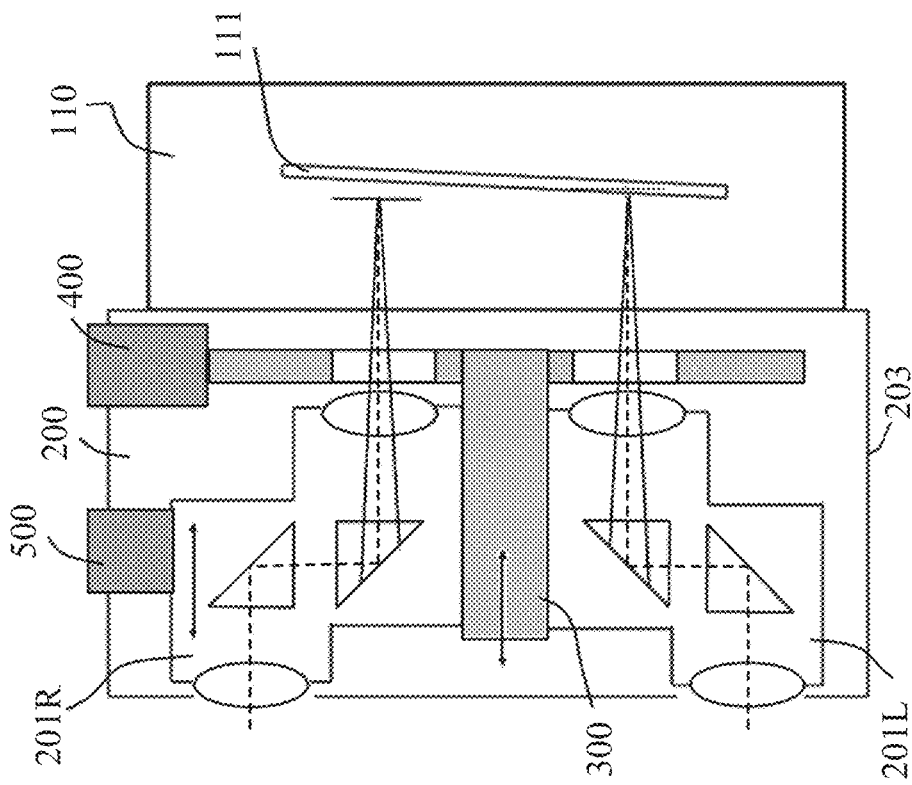
FIG. 12 is another diagram illustrating a configuration of the image pickup lens according to the second embodiment.

However, as illustrated in FIG. 12, a manufacturing error in the camera 110 may make the image sensor 111 slightly tilted and not parallel to the mount surface of the lens mount 202. In this state, the focus states of the right-eye and left-eye optical systems 201R and 201L on the image sensor 111 do not match each other. FIG. 12 illustrates the tilt of the image sensor 111 in an exaggerated manner with respect to an actual tilt.

Since the image sensor 111 may be tilted as described above, in this embodiment, the right-eye optical system 201R is made to be movable in the optical axis direction relatively to the lens top/bottom bases 300 and 301 and the left-eye optical system 201L that is fixed to the lens top/bottom bases 300 and 301. A focus adjusting unit 500 can be reached from outside the exterior cover member 203 and is operated by the user to adjust the position of the right-eye optical system 201R in the optical axis direction. A detailed description is given later of a position adjusting mechanism for adjusting the position of the right-eye optical system 201R in the optical axis direction by an operation on the focus adjusting unit 500.

Even in a case where the image sensor 111 is tilted as illustrated in FIG. 12, operating the focus adjusting unit 500 can adjust the position of the right-eye optical system 201R in the optical axis direction relative to the left-eye optical system 201L according to the tilt. Thereby, it is possible to make the focus states of the right-eye and left-eye optical systems 201R and 201L on the image sensor 111 match each other. From this state, when the focus of the right-eye and left-eye optical systems 201R and 201L are adjusted by a rotational operation on the focus operating unit 400, in-focus states of the right-eye and left-eye optical systems 201R and 201L can be acquired.

Figure 13:
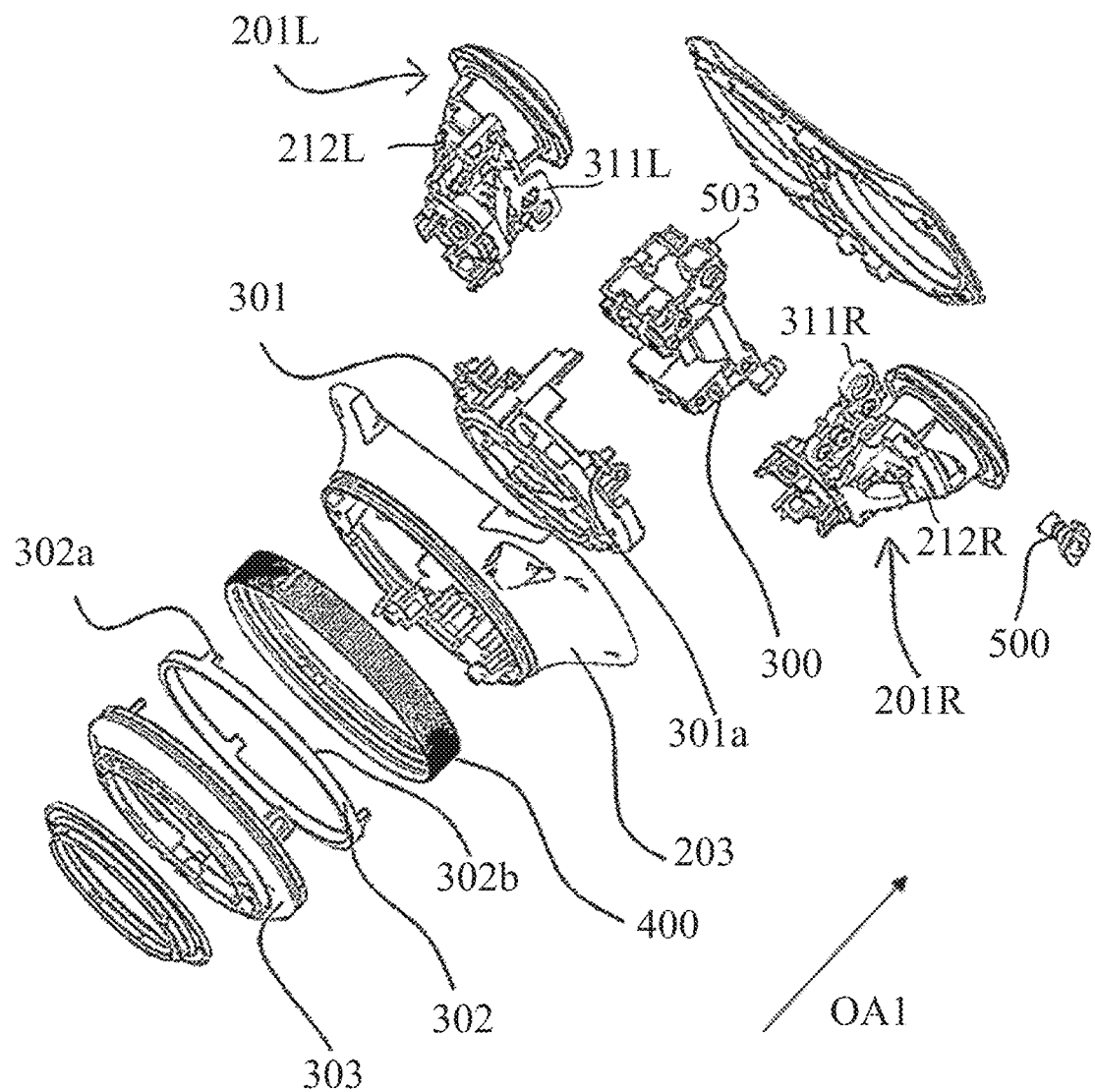
FIG. 13 is an exploded perspective view of the image pickup lens according to the second embodiment.

FIG. 13 illustrates an exploded view of a configuration for moving the right-eye and left-eye optical systems 201R and 201L by rotationally operating the focus operating unit 400. The drawing also illustrates the focus adjusting unit 500.

Figure 14:
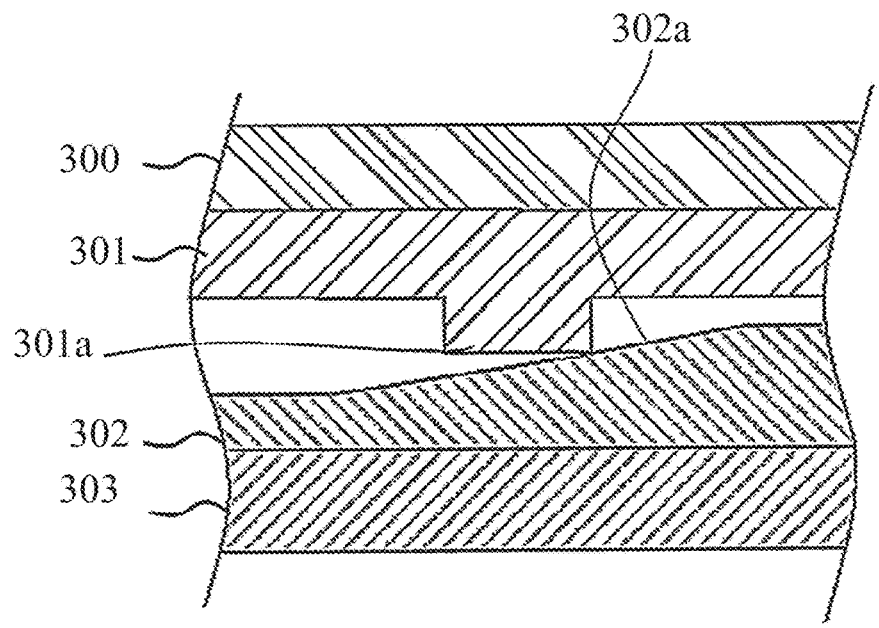
FIG. 14 is a diagram illustrating a focus operating unit of the image pickup lens according to the second embodiment.

The lens bottom base 301 has cam follower portions 301a at three locations in the circumferential direction. The cam follower portions 301a are in contact with, in the optical axis direction, cam portions 302a provided at three locations in the circumferential direction on a cam member 302. The lens bottom base 301 is biased by a spring (not illustrated) so that the cam follower portions 301a are always in contact with the cam portions 302b. As illustrated in FIG. 14, each cam portion 302a has a shape in which a thickness in its optical axis direction (vertical direction in the drawing) varies linearly in the circumferential direction. The exterior cover member 303 holds the cam member 302 rotatably in the circumferential direction.

A focus ring as the focus operating unit 400 is sandwiched in the optical axis direction between a front cover member 203a and a rear cover member 203b each of which is included in the exterior cover member 203, and is held rotatably in the circumferential direction. Three portions in the circumferential direction on an inner circumference portion of the focus operating unit 400 are engaged with side surfaces of the cam portions 302a in the circumferential direction. Thus, when the user rotationally operates the focus operating unit 400 in the circumferential direction, the cam member 302 also rotates together.

When the cam member 302 rotates, the thickness of each cam portion 302a changes in the optical axis direction at the position where the cam portion 302a is in contact with the cam follower portion 301a. As a result, the lens bottom base 301 moves in the optical axis direction. That is, the right-eye and left-eye optical systems 201R and 201L move together in the optical axis direction.

Figure 15:
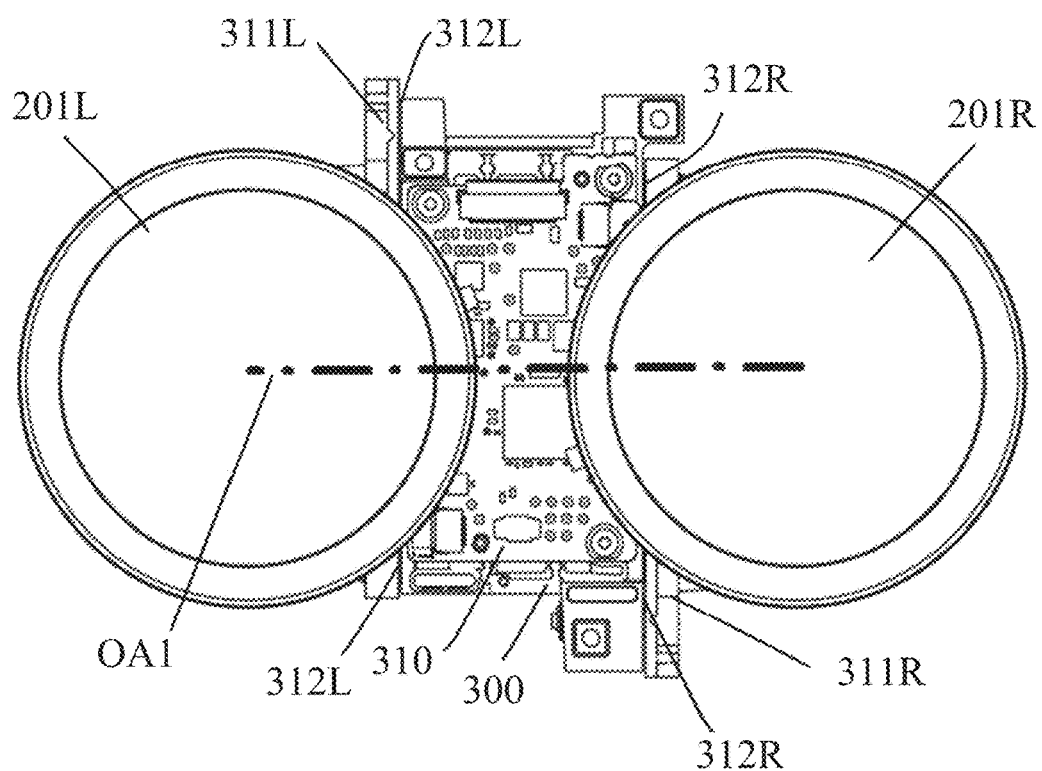
FIG. 15 is a top view of the image pickup lens according to the second embodiment.
Figure 16:
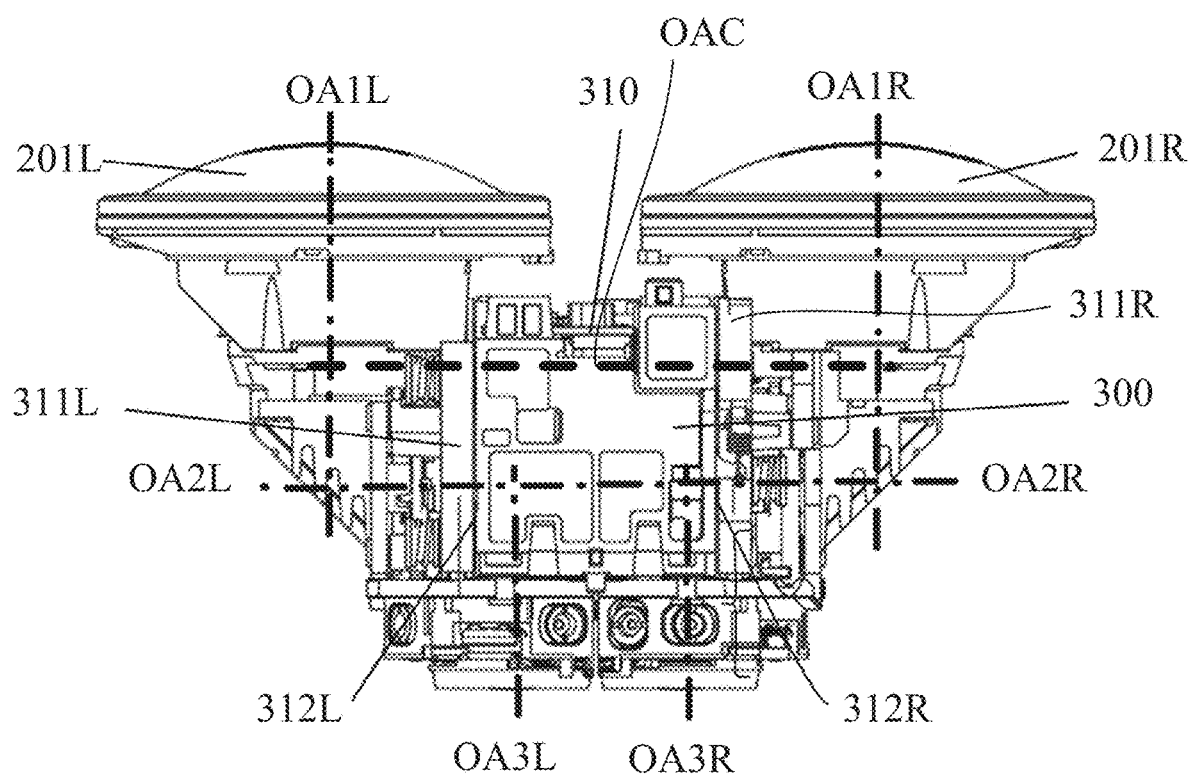
FIG. 16 is a side view of the image pickup lens according to the second embodiment.

Next, a description is given of a configuration for attaching the right-eye and left-eye optical systems 201R and 201L to the lens top base 300 with reference to FIGS. 13, 15, and 16. FIGS. 15 and 16 are a front view and a side view, respectively, of the right-eye and left-eye optical systems 201R and 201L, a base prism bottom 311, and the lens top base 300.

The right-eye and left-eye optical systems 201R and 201L are positioned so that the lens top base 300 is disposed between them in the left-right direction. A right side surface and a left side surface of the lens top base 300 are connected to base connecting portions 311R and 311L provided on the lens holding members 212R and 212L, respectively, as illustrated in FIG. 13. In this embodiment, as described later, the base connecting portions 311R and 311L are allowed to slide in the optical axis direction relatively to the lens top base 300.

The lens top base 300 is disposed between the first optical axes OA1R and OA1L of the right-eye and left-eye optical systems 201R and 201L. The second optical axes OA2R and OA2L and the third optical axes OA3R and OA3L pass through concave portions that open rearward in the lens top base 300. This is because if the lens top base 300 is disposed between the third optical axes OA3R and OA3L, the distance between the third optical axes OA3R and OA3L becomes wider, and the third lens units 231R and 231L cannot be accommodated inside the lens mount 202.

As illustrated in FIGS. 15 and 16, connecting surfaces 312R and 312L where the lens top base 300 and the base connecting portions 311R and 311L of the lens holding members 212R and 212L are connected are formed as surfaces orthogonal to a line OAC connecting the first optical axes OA1R and OA1L. The connecting surfaces 312R and 312L are orthogonal to the second optical axes OA2R and OA2L. The connecting surfaces 312R and 312L are respectively surfaces parallel to the first optical axes OA1R and OA1L and the third optical axes OA3R and OA3L and located between the first optical axis OA1R and the third optical axis OA3R and between the first optical axis OA1L and the third optical axis OA3L. This arrangement can improve space efficiency and allows a circuit board 310 to be disposed between the connecting surfaces 312R and 312L.

Figure 17:
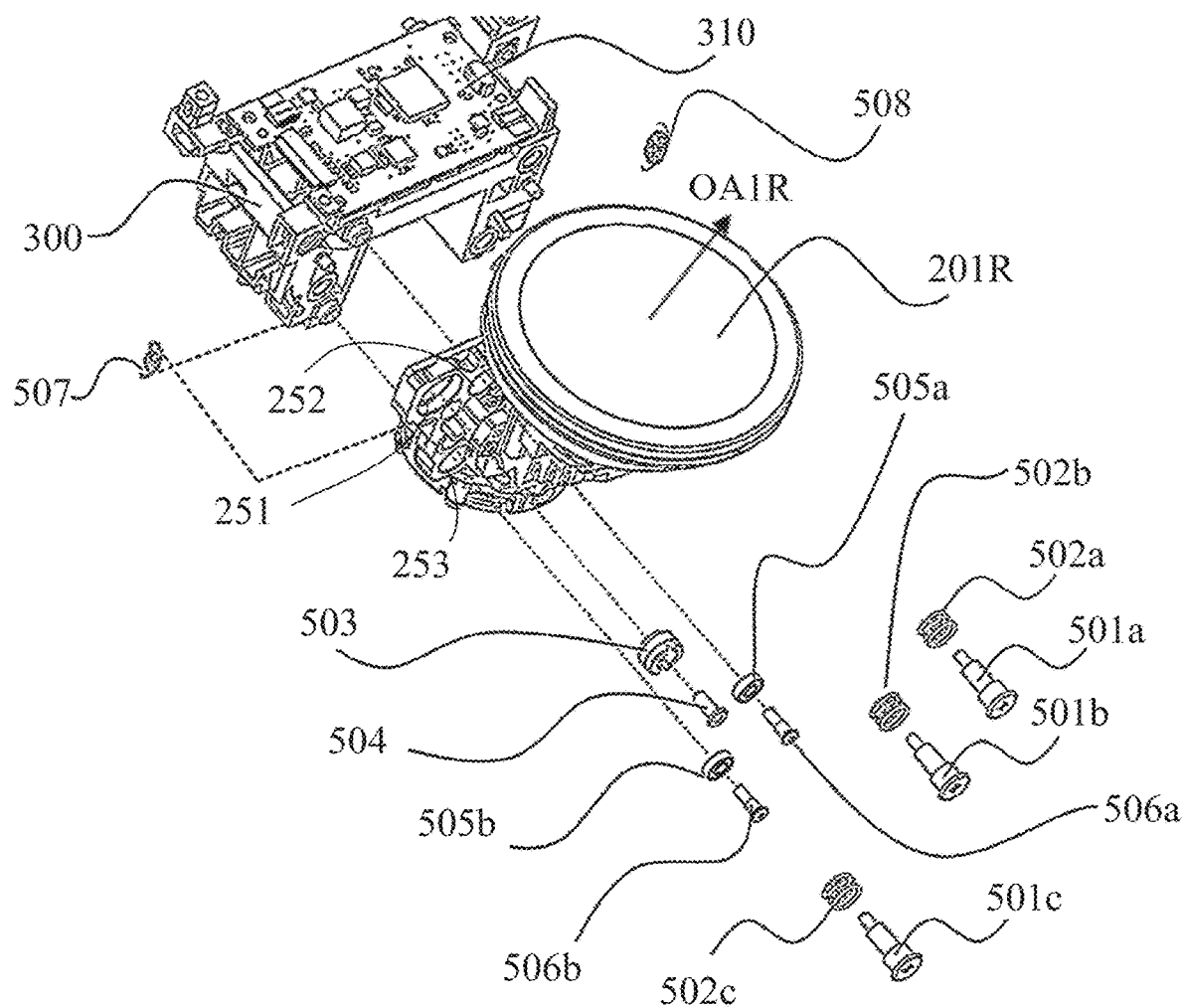
FIG. 17 is an exploded perspective view of a focus adjusting unit of the image pickup lens according to the second embodiment.
Figure 18:
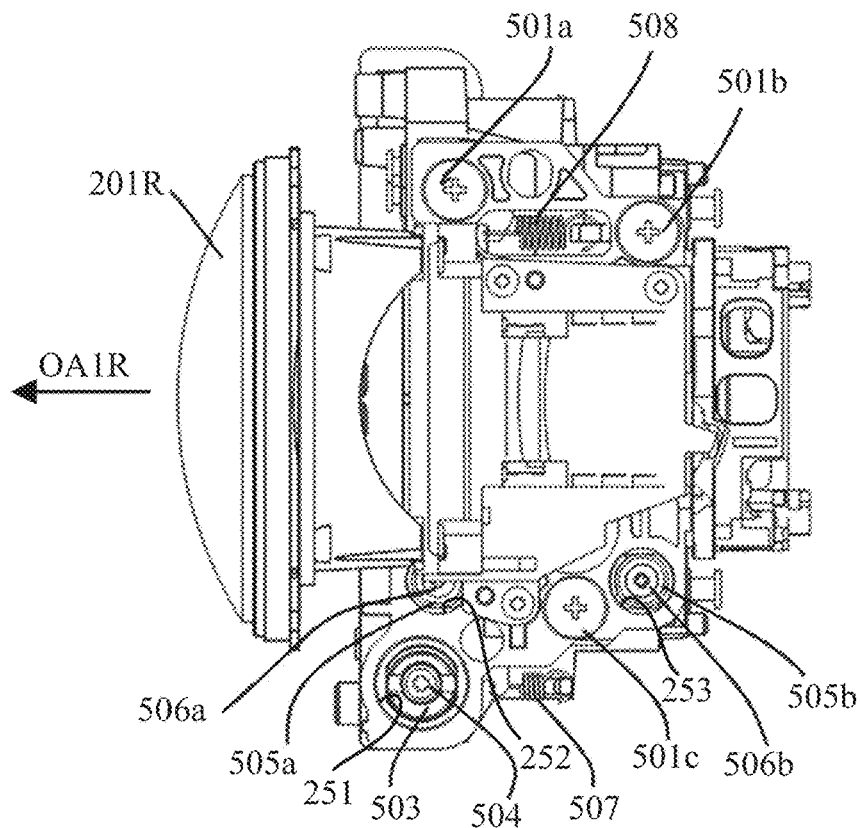
FIG. 18 is a side view of the focus adjusting unit according to the second embodiment.
Figure 19:
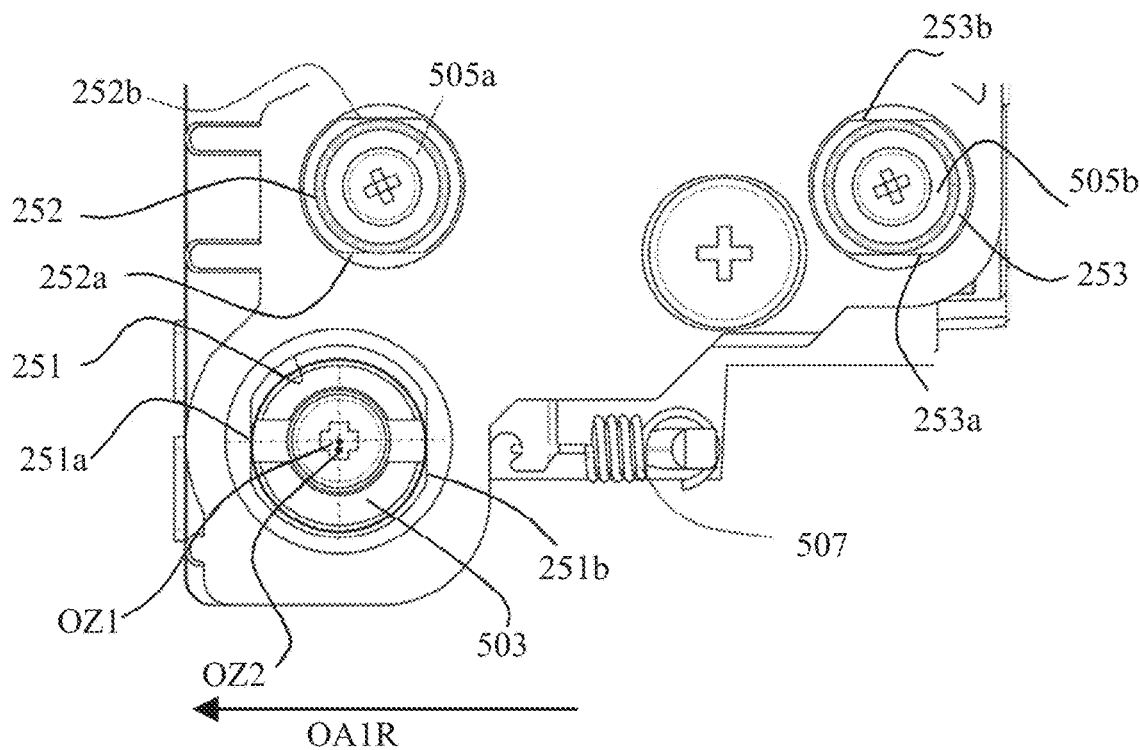
FIG. 19 is a partial enlarged view of the focus adjusting unit of the image pickup lens according to the second embodiment.

Next, a description is given of a position adjusting mechanism for moving the right-eye optical system 201R relatively to the lens top base 300 with reference to FIGS. 17, 18, and 19. FIG. 17 is an exploded view of the position adjusting mechanism, and FIG. 18 is a side view of the position adjusting mechanism. FIG. 19 is an enlarged view of part of the position adjusting mechanism.

A base connecting portion 311R of the lens holding member 212R that holds the right-eye optical system 201R is connected to the right side surface of the lens top base 300 by three screws 501a to 501c and three compression springs 502a to 502c located on outer circumferences of three screws 501a to 501c in a state such that the base connecting portion 311R is always biased against the right side surface of the lens top base 300. A decentering-rotating member 503 is rotatably attached to the lens top base 300 by a shoulder screw 504. The decentering-rotating member 503 is positioned inside a hole portion 251 provided on the base connecting portion 311R. The decentering-rotating member 503 rotates inside the hole portion 251 as the focus adjusting unit 500 is rotationally operated.

As illustrated in FIG. 19, the decentering-rotating member 503 has an outer shape center OZ2 that is decentered from a rotation center OZ1. Inside the hole portion 251, D-cut portions 251a and 251b are provided on both sides in the optical axis direction. The base connecting portion 311R and the lens top base 300 are biased in directions such that they approach each other in the optical axis direction by a first tension spring 507 hooked to each of them. Hence, an outer circumferential surface of the decentering-rotating member 503 is in contact with the D-cut portions 251a and 251b of the hole portion 251.

In such a configuration, when the decentering-rotating member 503 rotates about the rotation center OZ1, the base connecting portion 311R (that is, the right-eye optical system 201R) slides in the optical axis direction relatively to the lens top base 300 by the decentering amount of the outer shape center OZ2 from the rotation center OZ1. Thereby, it is possible to adjust the position of the right-eye optical system 201R in the optical axis direction relative to the lens top base 300.

Two ball bearings 505a and 505b are attached to the lens top base 300 by shoulder screws 506a and 506b so that the ball bearings 505a and 505b are aligned in the optical axis direction. The ball bearings 505a and 505b are respectively located inside guide hole portions 252 and 253 provided on the base connecting portion 311R, and respectively in contact with straight guide surfaces 252a and 252b, and 253a and 253b in the guide hole portions 252 and 253. Thereby, a straight guide portion is configured that guides the right-eye optical system 201R in the optical axis direction.

As illustrated in FIG. 18, a second tension spring 508 is hooked to the base connecting portion 311R and the lens top base 300. The second tension spring 508 biases the base connecting portion 311R and the lens top base 300 in a direction such that they approach each other in the optical axis direction, and causes a rotational moment around a connection portion between the decentering-rotating member 503 and the hole portion 251a in the base connecting portion 311R. With this configuration, the right-eye optical system 201R can move in the optical axis direction while being guided by the two ball bearings 505a and 505b without rattling in the vertical direction.

Figure 20:
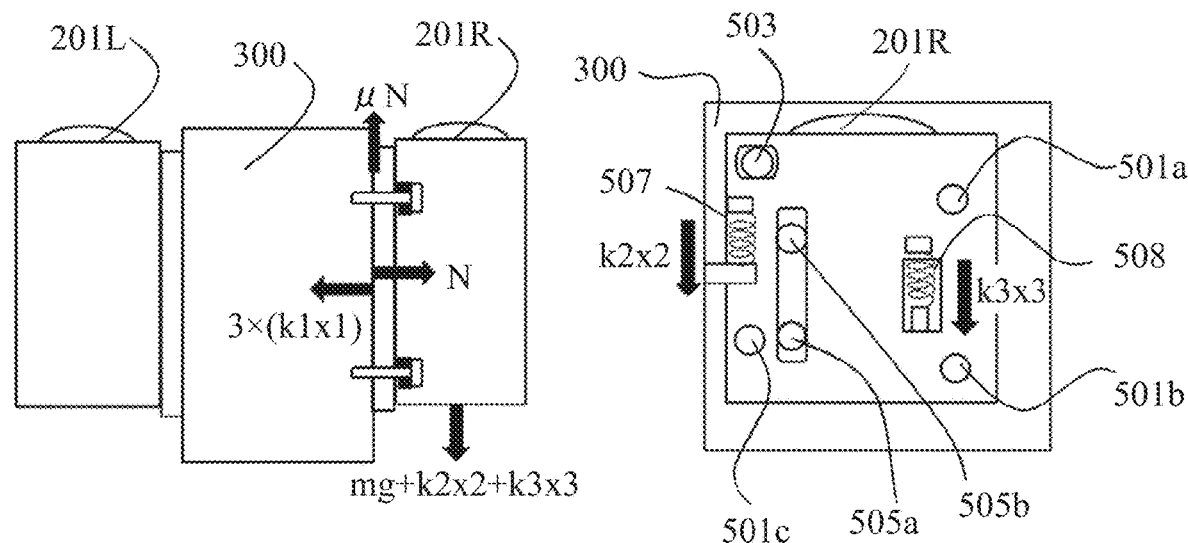
FIG. 20 is a schematic diagram illustrating a load balance of the image pickup lens according to the second embodiment.

Next, a description is given of a balance of loads occurring between the lens top base 300 and the right-eye optical system 201R with reference to FIG. 20. Here, m represents a mass of the right-eye optical system 201, g represents a gravitational acceleration, μ represents a static friction coefficient between the lens top base 300 and the right-eye optical system 201R, and k1 represents a spring constant and x1 represents an elongation amount of each of the three compression springs 502a to 502c. k2 represents a spring constant and x2 represents an elongation amount of the first tension spring 507, and k3 represents a spring constant and x3 represents an elongation amount of the second tension spring 508. In this case, load balance conditions expressed by the following inequality (1) and equation (2) is satisfied in state where the right-eye optical system 201R faces the direction of gravity (downward).

$$\mu N + Mg < k2 \cdot x2 + k3 \cdot x3 \quad (1)$$

$$N = 3(k1 \cdot x1) \quad (2)$$

By satisfying these conditions, the decentering-rotating member 503 and the right-eye optical system 201R are always in contact with each other without rattling regardless of which direction the image pickup lens 200 faces (regardless of a position or an orientation of the image pickup lens 200). Thereby, it is possible to prevent a state where the right-eye optical system 201R does not follow the rotation of the decentering-rotating member 503 and does not move in the optical axis direction.

With the above-described position adjusting mechanism of the right-eye optical system 201R, the focus adjusting unit 500 can move the right-eye optical system 201R relatively to the lens top base 300 in the optical axis direction without rattling even in a case where the focus adjusting unit 500 is located at a position away from the optical axis of the right-eye optical system 201R.

A position adjusting mechanism similar to the above may also be provided for the left-eye optical system 201L. During assembly of the image pickup lens 200, rotating the decentering-rotating member can adjust the position of the left-eye optical system 201L relative to the lens top base 300 in the optical axis direction. The lens holding members 203R and 203L (base connecting portions 311R and 311L) are directly connected to the lens top base 300 without any other parts in between, so that occurrence is suppressed of relative tilt and decentering of the right-eye and left-eye optical systems 201R and 201L during focus adjustment.

In this embodiment, a description is given of the position adjusting mechanism having the configuration using the decentering-rotating member, but the position adjusting mechanism of other configurations may be used. Also, a description is given of the case where the ball bearing is used for the straight guide portion of the position adjusting mechanism, but a guide bar extending in the optical axis direction, etc. may be used.

Figure 21:
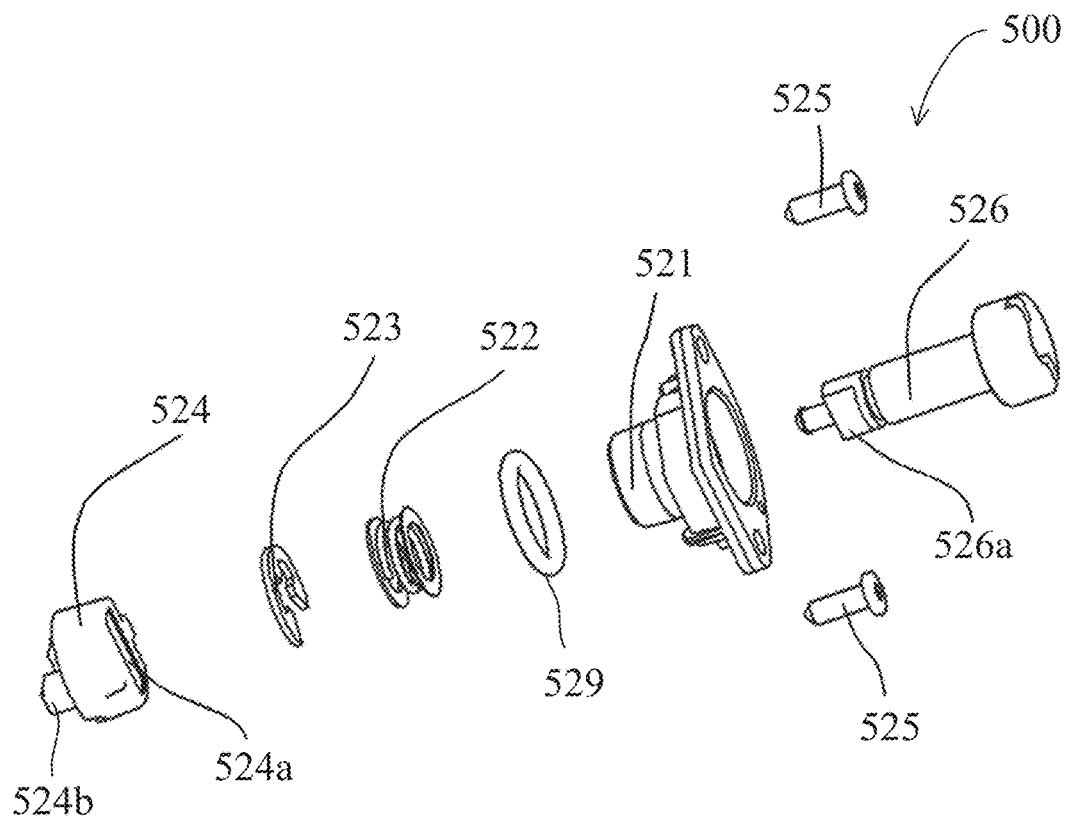
FIG. 21 is an exploded perspective view of the focus adjusting unit according to the second embodiment.
Figure 22:
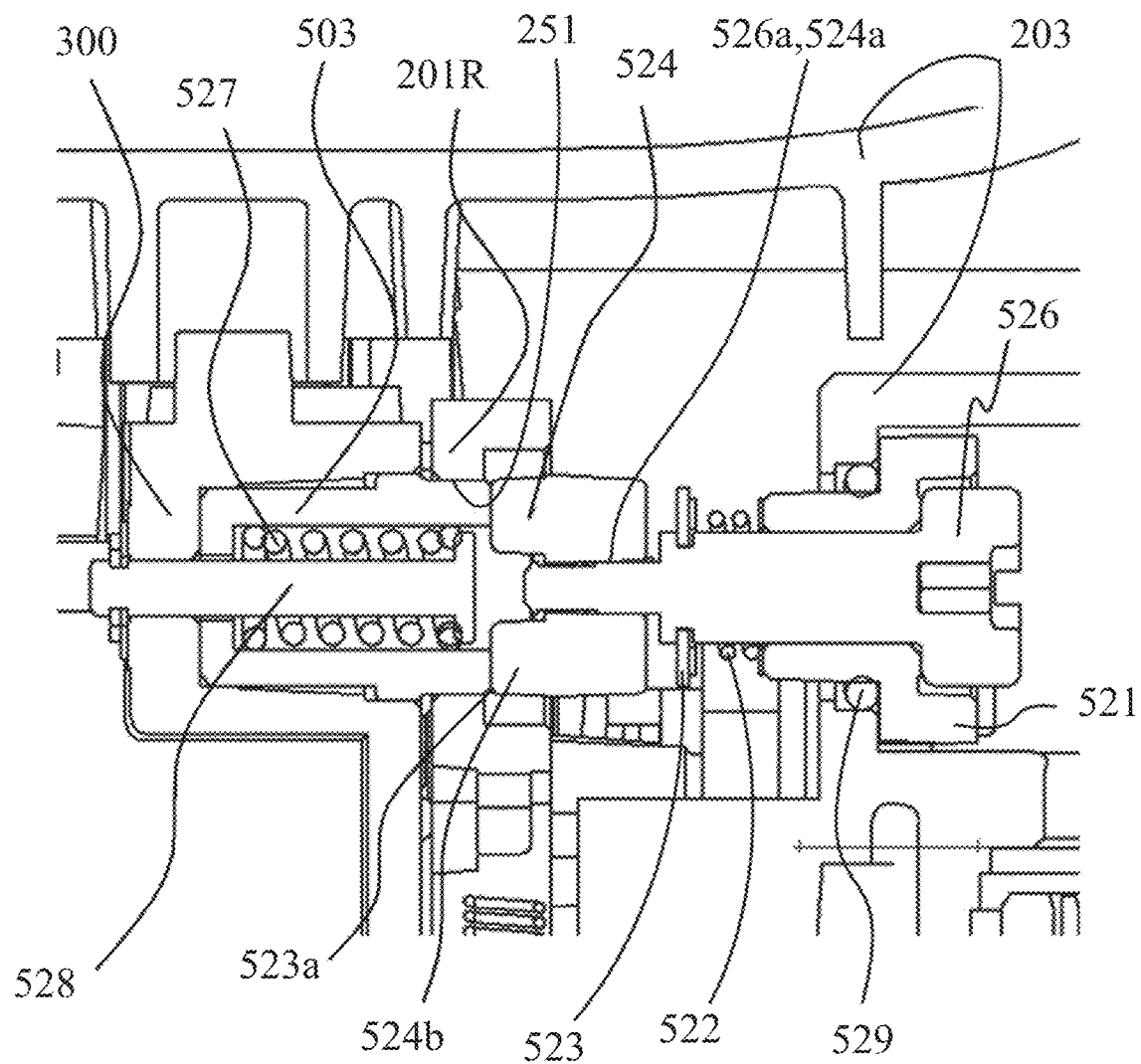
FIG. 22 is a sectional view of the focus adjusting unit according to the second embodiment.

Next, a description is given of a configuration of the focus adjusting unit 500 with reference to FIGS. 21 and 22. FIG. 21 is an exploded view of the focus adjusting unit 500. FIG. 22 illustrates a connection between the focus adjusting unit 500 and the decentering-rotating member 503 of the position adjusting mechanism described above.

In the focus adjusting unit 500, an adjusting base 521 has a small diameter portion and a large diameter portion with a through hole formed in the center. The adjusting base 521 is attached to the exterior cover member 203 with two screws 525 in a state in where the small diameter portion is inserted into a hole portion provided on an inner part away from the outer surface of the exterior cover member 203 and a stepped portion between the small diameter portion and the large diameter portion is in contact with the periphery of the hole. An O-ring 529 is disposed between the small diameter portion of the adjusting base 521 and the hole portion of the exterior cover member 203 into which the small diameter portion is inserted.

The adjusting pin 526 is rotatably inserted into the through hole of the adjusting base 521. A spring 522 is disposed on an outer circumference of a middle portion of the adjusting pin 526 that is inserted into the adjusting base 521. The spring 522 is compressed between a retaining ring 523 attached to the adjusting pin 526 and an end surface of the small diameter portion of adjusting base 521. Thereby, the adjusting pin 526 is biased in a direction of insertion into the adjusting base 521.

The connecting member 524 is engaged with a first guide portion 526a provided at a tip of the adjusting pin 526. The first guide portion 526a has two surfaces parallel to a shaft direction of the adjusting pin 526 on both sides of a shaft of the adjusting pin 526, and the two surfaces are in contact with a second guide portion 524a formed as two surfaces parallel to the shaft direction formed inside a groove portion provided on the connecting member 524. Thereby, the connecting member 524 is held movably in a direction orthogonal to the shaft direction of the adjusting pin 526.

As illustrated in FIG. 22, the tip of the connecting member 524 is provided with a third guide portion 524b formed as a key-shaped protrusion. The third guide portion 524b is in contact with a fourth guide portion 503a provided on the decentering-rotating member 503. Therefore, the user can rotate the adjusting pin 526 with a tool to rotate the decentering-rotating member 503 so as to adjust the position of the right-eye optical system 201R in the optical axis direction.

In this embodiment, the second guide portion 524a is formed in the groove portion and the third guide portion 524b is formed as a protrusion, but the second guide portion 524a may be formed as a protrusion and the third guide portion 524b may be formed in a groove portion.

On the connecting member 524, the second guide portion 524a and the third guide portion 524b are formed in directions that are orthogonal to the shaft direction of the adjusting pin 526 and orthogonal to each other. Since the second guide portion 524a and the third guide portion 524b are formed in this way, a direction in which the connecting member 524 can move relatively to the adjusting pin 526 and a direction in which the connecting member 524 can move relatively to the decentering-rotating member 503 are orthogonal to each other. As a result, for example, even in a case where a positional relation between the exterior cover member 203 and the right-eye optical system 201R is changed by operating the focus adjusting unit 500, the right-eye optical system 201R can be moved in the optical axis by rotating the adjusting pin 526.

The decentering-rotating member 503 is pressed against the lens top base 300 by a spring 527 and a stopper pin 528, and its rotational position is held by friction with the lens top base 300. This prevents the position of the right-eye optical system 201R in the optical axis direction from being easily changed by an external force such as shock.

Figure 23:
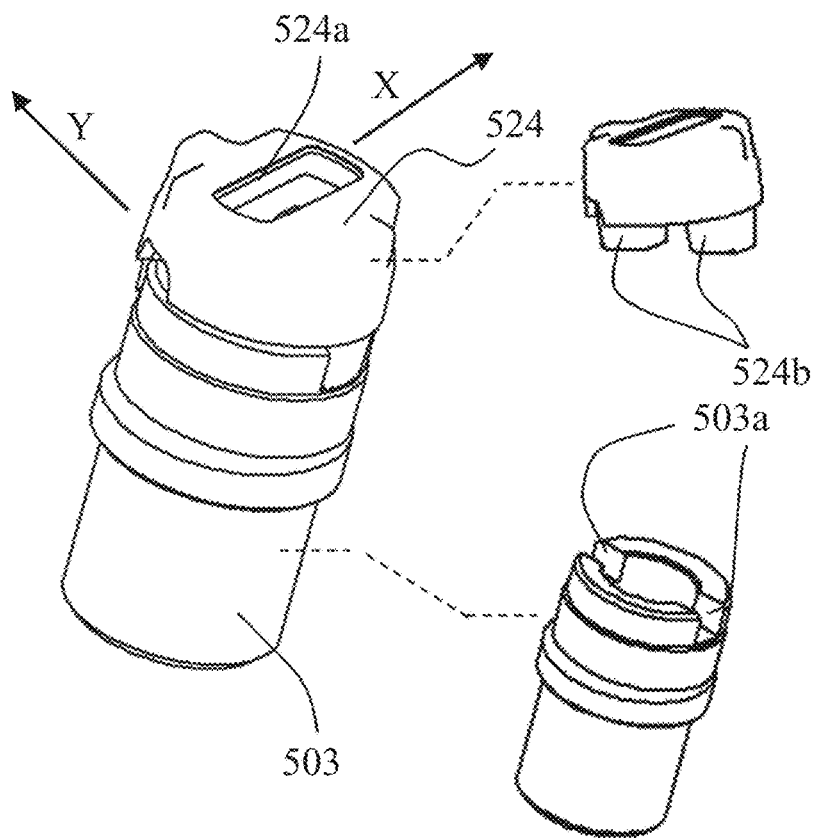
FIG. 23 is a perspective view of the focus adjusting unit according to the second embodiment.

FIG. 23 illustrates the connecting member 524 and the decentering-rotating member 503. As described above, the connecting member 524 includes, in its groove portion, the second guide portion 524a that is in contact with the first guide portion 526a provided on the adjusting pin 526. The contact between the first guide portion 526a and the second guide portion 524a makes the connecting member 524 movable relatively to the adjusting pin 526 in an X direction in the drawing orthogonal to the shaft direction of the adjusting pin 526. The third guide portion 524b of the connecting member 524 is formed as a protrusion extending in a Y direction orthogonal to the X direction. The third guide portion 524b is in contact with the fourth guide portion 503a that is provided on the decentering-rotating member 530 and extends in the Y direction. Thereby, the connecting member 524 is movable relatively to the decentering-rotating member 530 in the Y direction and movable relatively to the adjusting pin 526 in the X direction that is orthogonal to the shaft direction and orthogonal to the Y direction.

Figure 24:
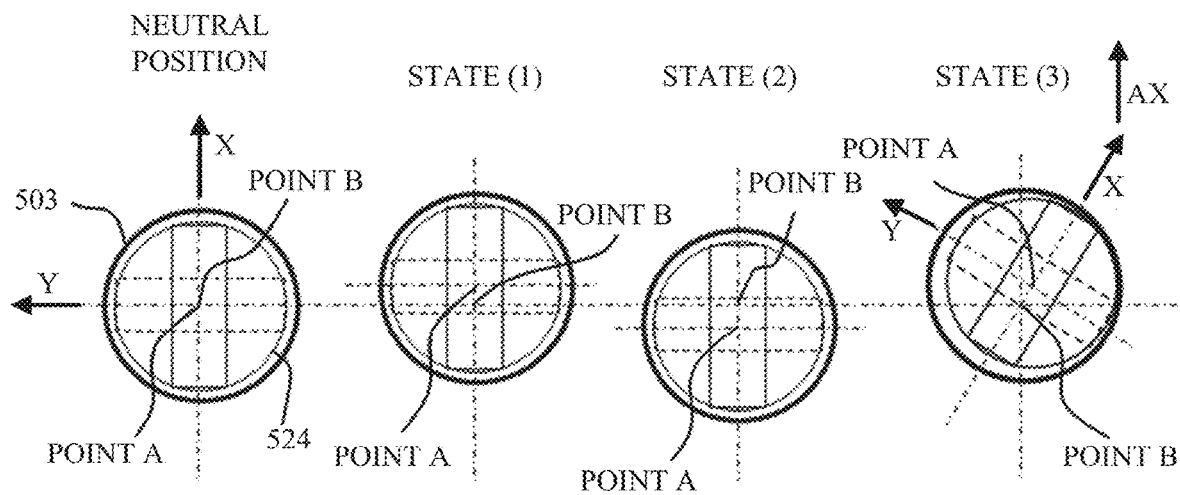
FIG. 24 is a schematic diagram of the focus adjusting unit according to the second embodiment.

FIG. 24 illustrates a positional relation between the decentering-rotating member 503 and the connecting member 524 when the focus operating unit 400 and/or the focus adjusting unit 500 are rotationally operated. A thick line circle represents the decentering-rotating member 503, and a thin line circle represents the connecting member 524. A thin solid line represents the second guide portion 524a provided on the connecting member 524, and a thin broken line represents the third guide portion 524b provided on the connecting member 524. A point A represents a rotation center of the decentering-rotating member 503 (OZ1 in FIG. 19), and a point B represents a rotation center of the adjusting pin 526 engaged with the connecting member 524. Since the adjusting pin 526 is held at a fixed position by the exterior cover member 203, the position of the point B does not move. In a state of a neutral position, the position of the point B matches the position of the point A. AX represents the optical axis direction. X and Y represents the same directions as in FIG. 23.

In a case where the focus operating unit 400 is rotationally operated from the neutral position, the lens top base 300 moves in the AX direction, and the decentering-rotating member 503 attached to the lens top base 300 also moves in the same direction. At this time, relative movement in the X direction between the decentering-rotating member 503 and the connecting member 524 is limited by the contact between the third guide portion 524b and the fourth guide portion 503a, and relative movement in the X direction of the connecting member 524 (second guide member 524a) relative to the adjusting pin 526 (first guide portion 526a) is allowed. Therefore, when the decentering-rotating member 503 moves in the optical axis direction AX, the connecting member 524 also moves in the AX direction (=X direction) as illustrated in a state (1) and a state (2).

For example, in a state (3) in which the adjusting pin 526 is rotationally operated from the state (1) and the connecting member 524 and the decentering-rotating member 503 are rotated, the X direction is tilted relatively to the AX direction. If the focus operating unit 400 is rotationally operated in this state, the decentering-rotating member 503 moves in the AX direction by moving together with the connecting member 524 in the X direction relatively to the adjusting pin 526 while moving in the Y direction relatively to the connecting member 524. Therefore, even after the focus operating unit 400 is rotationally operated, the rotation can be transmitted from the adjusting pin 526 to the decentering-rotating member 503 through the connecting member 524.

As described above, providing, between the adjusting pin 526 and the decentering-rotating member 503, the connecting member 524 movable in the X and Y directions relatively to the adjusting pin 526 and the decentering-rotating member 503 enables operations on the focus operating unit 400 and the focus adjusting unit 500 independent of each other.

Third Embodiment

Figure 25:
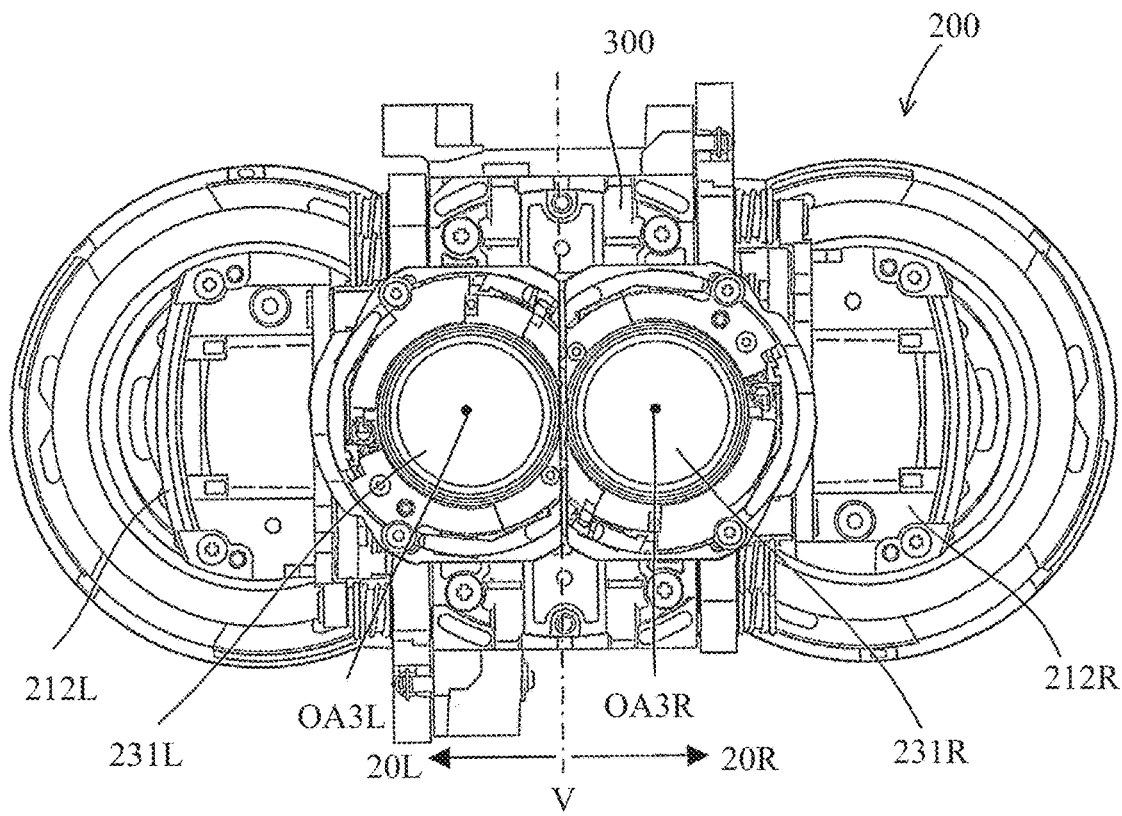
FIG. 25 is a top view of a stereo image pickup lens according to a third embodiment.
Figure 26:
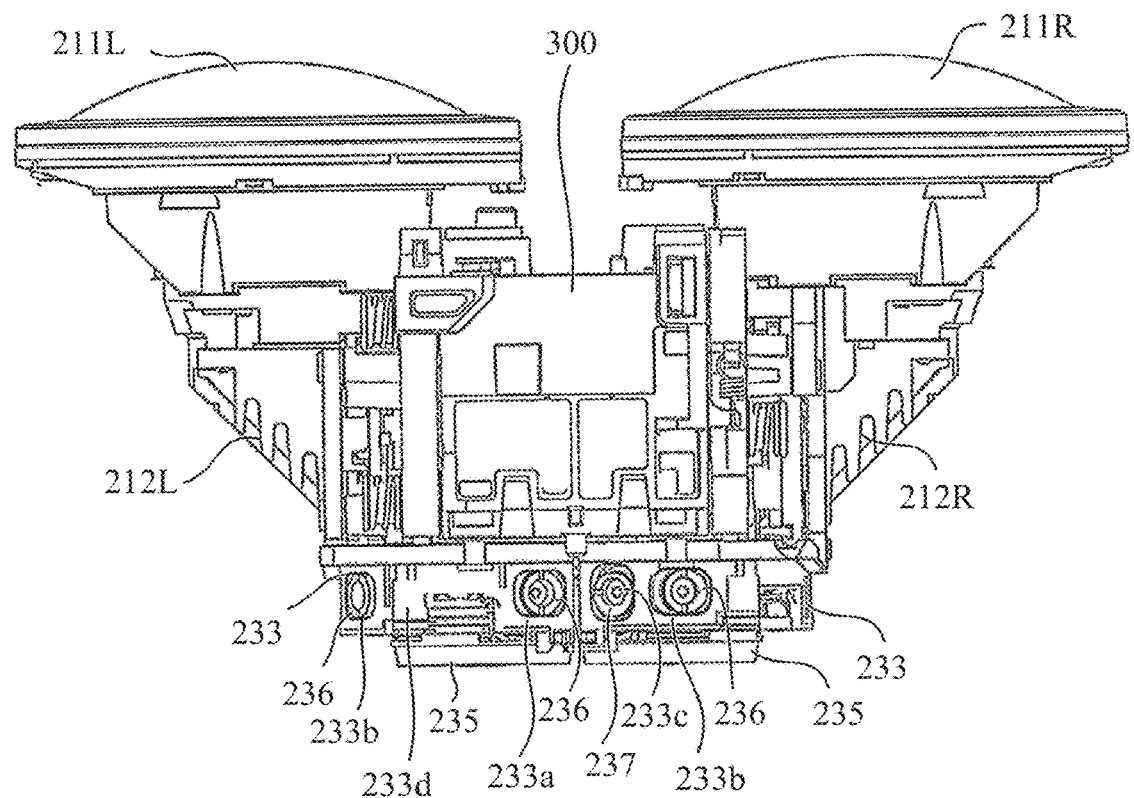
FIG. 26 is a side view of the image pickup lens according to the third embodiment.
Figure 27:
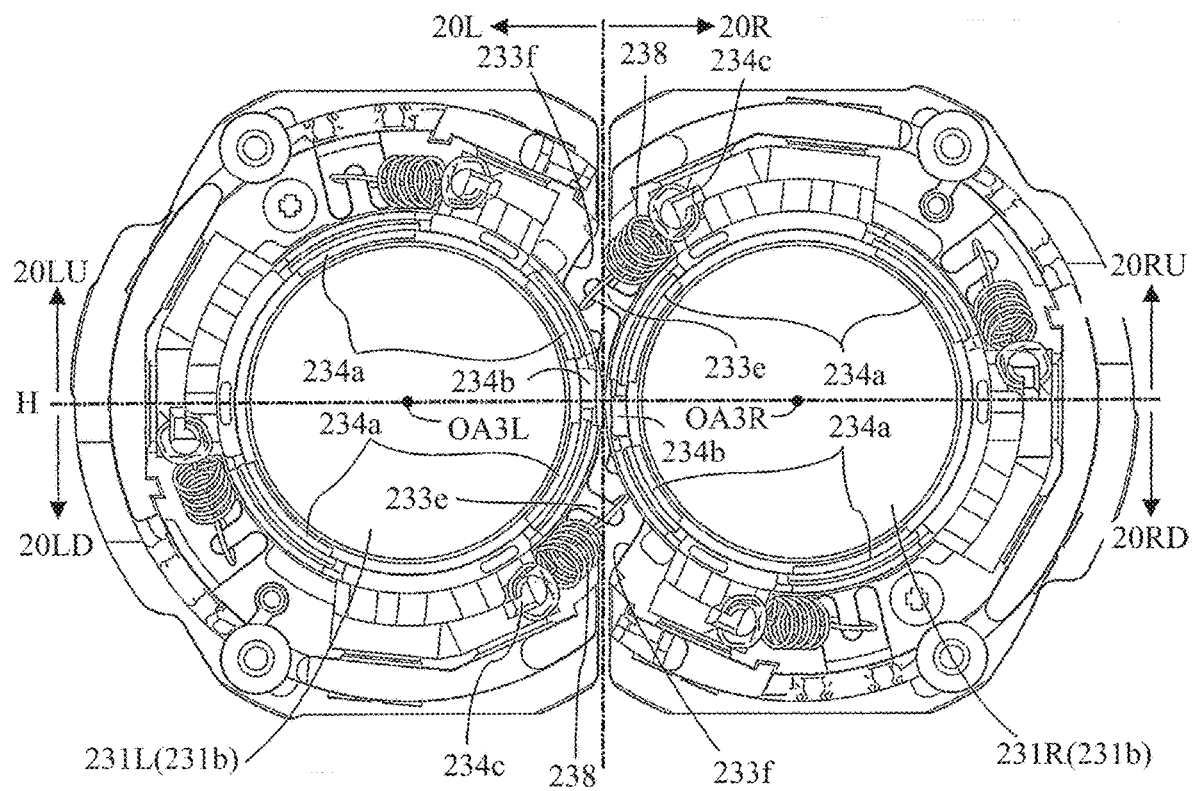
FIG. 27 is a rear view of holding mechanisms of third lens units in the image pickup lens according to the third embodiment.
Figure 28:
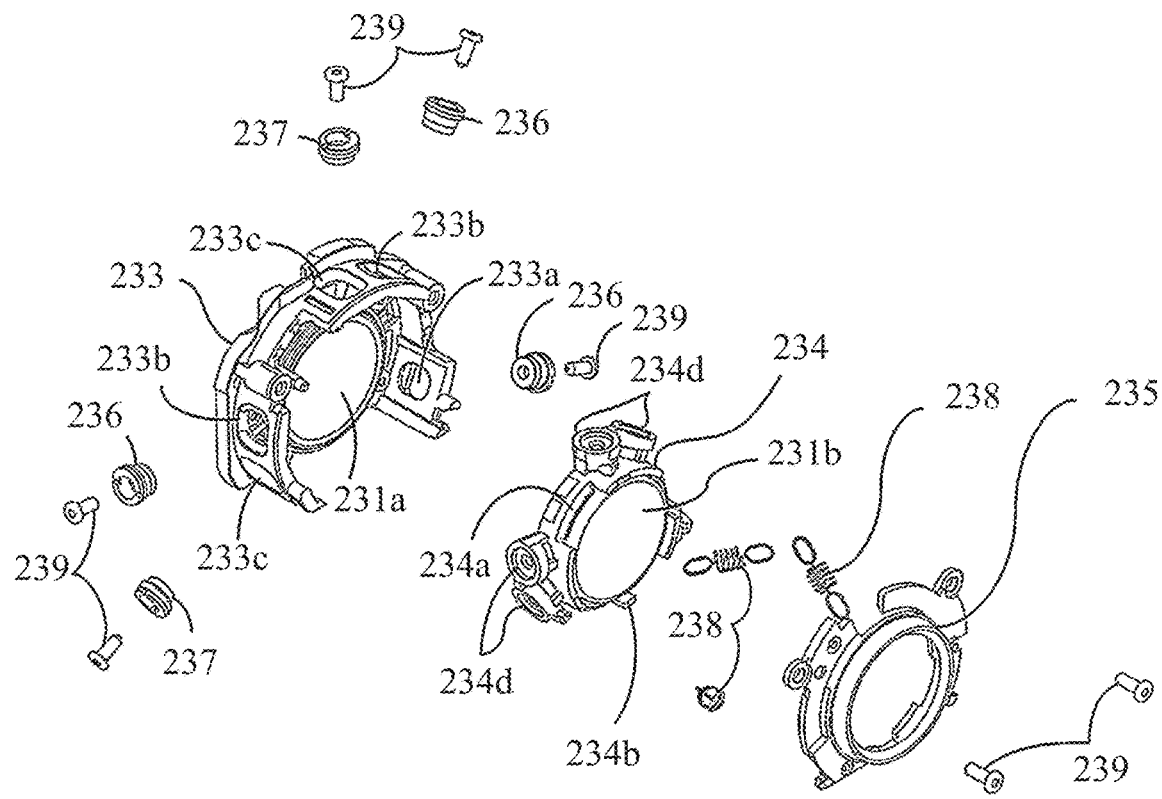
FIG. 28 is an exploded perspective view of the holding mechanism of the third lens unit according to the third embodiment.
Figure 29:
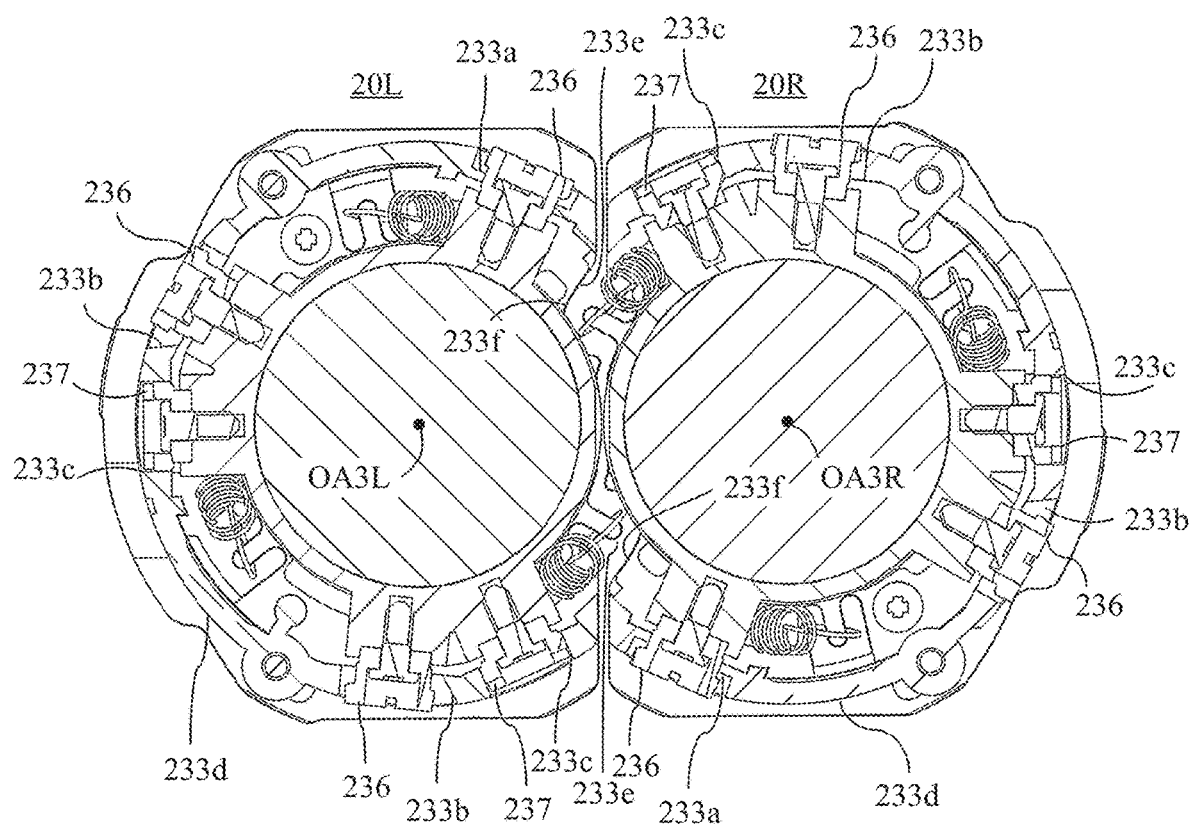
FIG. 29 is a sectional view of the holding mechanisms of the third lens units according to the third embodiment.

Each of FIGS. 25 and 26 illustrates an optical unit in which the lens holding members 212R and 212L hold the right-eye and left-eye optical systems (first lens units 211R and 211L to third lens units 231R and 231L) of the image pickup lens 200 according to a third embodiment of the present disclosure. FIG. 25 is a bottom view of the optical unit as viewed from the rear side (image side), and FIG. 26 illustrates the optical unit as viewed from the upper side. Each of FIGS. 27, 28, and 29 illustrates holding mechanisms of the third lens units 231R and 231L. FIG. 27 illustrates the holding mechanisms as viewed from the rear side, and FIG. 28 is an exploded view of the holding mechanism. The holding mechanisms of the third lens units 231R and 231L only differ in a phase of arrangement around the third optical axis OA3R and OA3L (are rotationally symmetrical about a central axis of the lens mount), and thus FIG. 28 illustrates one of the holding mechanisms. FIG. 29 illustrates a section of the holding mechanism as viewed from the rear side passing through a central axis of a decentering roller, which is described later.

Each of the third lens units 231R and 231L includes the front lens 231a and the rear lens 231b as described in the first embodiment. In each of the third lens units 231R and 231L, the entire outer circumference of the front lens 231a is held by the third unit base 233 by thermal caulking to the third unit base 233. The third unit base 233 includes a wall portion 233d having a shape in which a portion in the circumferential direction of a cylinder as a basic shape is D-cut. The third lens units 231R and 231L are screwed and fixed to the lens holding members 212R and 212L, respectively.

The rear lens 231b is held by a third unit holder 234 while four locations in the circumferential direction on the outer circumference portion of the rear lens 231b are thermally caulked to fastening portions 234a provided at four locations in the circumferential direction on the third unit holder 234. The left and right third unit bases 233 are arranged so that D-cut portions of the wall portions 233d are adjacent to each other. Part of the outer circumferential portions of the left and right third unit holders 234 are adjacent to each other in the D-cut area of the wall portion 233d (an area without the wall portion 233d) of the third unit base 233. In each of the left and right holding mechanisms formed and placed in this manner, a portion at a position where the left and right holding mechanisms are adjacent to each other (hereinafter also referred to as "adjacent portion") has a smaller thickness in the radial direction (the direction orthogonal to the optical axis of each third lens unit) than the other portion (the portion where the wall portion 233d is provided).

A roller seat, which is described later, is disposed on a portion of the third unit holder 234 where the fastening portion 234a is not provided. Generally, a lens is fastened (caulked) at three points to a member that holds the lens.

However, in this embodiment, the third unit holders 234 are arranged side by side on the left and right as illustrated in FIG. 27. In this case, if fastening portions of the left and right third unit holders 234 are provided on an intersection line of a V plane and an H plane, which is a central axis of the lens mount, and thermal caulking is performed, resin melted out from each fastening portion may form convex portions. Convex amounts vary because of variations in processing, and therefore the convex portions may interfere with each other. For this reason, as illustrated in FIG. 28, column portions 234b projecting rearward are provided on the adjacent portions of the left and right third unit holders 234 so that thermal caulking is not performed on these portions, which prevents the convex portions interfering with each other from being formed.

As illustrated in FIG. 27, the V plane and the H plane divide the entire area when viewed from the rear side into a right-eye upper area 20RU, a left-eye upper area 20LU, a right-eye lower area 20RD, and a left-eye lower area 20LD. At this time, the column portion 234b of the right third unit holder 234 is provided at a phase (position in a direction around the optical axis) near the right-eye lower area 20RD, and the column portion 234b of the left third unit holder 234 is provided at a phase near the left-eye upper area 20LU. Such an arrangement in which the phases of the column portions 234b are different from each other can make a portion on which thermal caulking is not performed so that a convex portion is not formed of each of the left and right third unit holders 234 smaller than the portion in an arrangement in which the column portions 234b of the left and right third unit holders 234 are located at symmetrical phases in the left-right direction. As a result, it is possible to hinder a holding strength (caulking strength) of the third unit holder 234 holding the rear lens 231b from being deteriorated.

On the wall portion 233d of the third unit base 233, one first hole portion 233a, two second hole portions 233b, and two third hole portions 233c are formed. A first decentering roller 236 is inserted into each of the first hole portion 233a and the second hole portions 233b, and a second decentering roller 237 is inserted into each third hole portion 233c. These five decentering rollers 236 and 237 are rotatably attached to roller seats 234d provided at five locations in the circumferential direction on the outer circumference portion of the third unit holder 234. The first and second decentering rollers 236 and 237 and the third unit base 233 having the first to third hole portions 233a to 233c form an optical adjusting mechanism that enables optical adjustment of each third lens unit.

The first hole portion 233a has, on an outer circumferential surface side and an inner peripheral surface side, two-step fitting portions respectively fitting a decentering portion and a concentering portion that are provided as two steps on each first decentering roller 236. The fitting portion on the outer circumferential surface side fits the decentering portion of the first decentering roller 236 in the optical axis direction (the direction in which the third optical axes OA3R and OA3L extend), but does not fit the decentering portion in the circumferential direction. The fitting portion on the inner circumferential surface side fits the concentering portion of the first decentering roller 236 over the entire circumference.

The second hole portion 233b has a fitting portion that fits the decentering portion of the first decentering roller 236. This fitting portion fits the decentering portion of the first decentering roller 236 in the optical axis direction, but does not fit the decentering portion in the circumferential direction.

The third hole portion 233c has a fitting portion that fits a decentering portion of the second decentering roller 237. This fitting portion fits the decentering portion of the second decentering roller 237 in the circumferential direction, but does not fit the decentering portion in the optical axis direction.

By rotating the three first decentering rollers 236 about their central axes, it is possible to adjust a distance between the rear lens 231b and the front lens 231a in the optical axis direction. By rotating the second decentering roller 237 about its central axis, it is possible to adjust the decentering of the rear lens 231b relative to the front lens 231a.

Three third tension springs 238 are provided that generate biasing force for preventing the rear lens 231b from being displaced in the optical axis direction and in the circumferential direction (i.e., for holding the rear lens 231 without rattling) by backlashes of fitting between the decentering rollers and the respective hole portions. The third tension spring 238 is hooked to a hook 234c provided on the third unit holder 234 and to a hook 233e provided on the third unit base 233, which are illustrated in FIG. 27, so that the third tension spring 238 is oblique to the optical axis direction. As a result, the third tension springs 238 bias the third unit holder 234 against the third unit base 233 in directions such that the third unit holder 234 and the third unit base 233 approach each other in the circumferential direction and in the optical axis direction.

Of the right holding mechanism, one of the three third tension springs 238 that is provided on the portion adjacent to the left holding mechanism and a hook 233e of the third unit base 233 to which the one third tension spring 238 is hooked (that is, part of one holding mechanism) are located on a left holding mechanism side of the V plane. Of the left holding mechanism, one of the three third tension springs 238 that is provided on the portion adjacent to the right holding mechanism and a hook 233e of the third unit base 233 to which the one third tension spring is hooked (that is, part of the other holding mechanism) are located on a right holding mechanism side of the V plane.

More specifically, as illustrated in FIG. 27, in the right holding mechanism, part of a third tension spring 238 most of which is located in the right-eye upper area 20RU and a hook 233e to which this third tension spring is hooked protrude to the left-eye upper area 20LU. In the left holding mechanism, part of a third tension spring 238 most of which is located in the left-eye lower area 20LD and a hook 233e to which this third tension spring 238 is hooked protrude to the right-eye lower area 20RD.

In the third unit base 233 of the left holding mechanism, the portion adjacent to the right holding mechanism is provided with a concave portion 233f that creates a space where the third tension spring 238 and the hook 233e of the right holding mechanism are located. Similarly, in the third unit base 233 of the right holding mechanism, the portion adjacent to the left holding mechanism is provided with a concave portion 233f that creates a space where the third tension spring 238 and the hook 233e of the left holding mechanism are located. By arranging the third tension springs 238 and the hooks 233e in the concave portions 233f in this way, it is possible to prevent the third tension spring 238 and the hook 233e of the right holding mechanism from interfering with the left holding mechanism and to prevent the third tension the spring 238 and the hook 233e of the left holding mechanism from interfering with the right holding mechanism.

After the third tension spring 238 is hooked to the hooks 233e and 234c, a third unit cap 235 is screwed and fixed to the third unit base 233 as illustrated in FIG. 28 so that the external appearance quality is improved and dust is prevented from entering.

By fixing the third lens units 231R and 231L to the lens holding members 212R and 212L and further fixing the lens holding members 212R and 212L to the lens top base 300, the left and right holding mechanisms are integrated. In this state, as illustrated in FIGS. 25, 26 and 29, no decentering roller is provided on the side surfaces on the V plane side, which are ends of the portions at positions where the left and right holding mechanisms are adjacent to each other, of the left and right holding mechanisms. The five decentering rollers 236 and 237 are arranged on portions other than the side surface on the V plane side. Thus, in a state where the left and right holding mechanisms are integrated, all decentering rollers 236 and 237 can be reached from outside in the radial direction of each holding mechanism and can be rotated so that each third lens unit can be optically adjusted.

According to this embodiment, the left and right third lens units 231R and 231L can be located close to each other and can be accommodated inside the lens mount. In addition, the holding mechanisms that enable optical adjustment of the third lens units 231R and 231L, respectively, are realized by arranging them rotationally symmetrically about the center axis of the lens mount and by using the same parts, which reduces the manufacturing cost of the image pickup lens.

The above-described embodiment can provide a stereo lens apparatus including a holding mechanism for holding each third lens unit within a narrowed distance between the third lens units.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-160381, filed on Sep. 30, 2021, which is hereby incorporated by reference herein in its entirety.

What is claimed is:

1. A stereo lens apparatus comprising two optical systems arranged in parallel,
    wherein each of the two optical systems includes, in order from an object side to an image side, a first lens unit, a second lens unit, and a third lens unit,
    wherein an optical path is bent at a position between the first lens unit and the second lens unit and at a position between the second lens unit and the third lens unit in each of the two optical systems so that an inter-optical axis distance between two third lens units of the two optical systems is narrower than an inter-optical axis distance between two first lens units of the two optical systems,
    wherein part of one holding mechanism of two holding mechanisms that are configured to respectively hold the two third lens units is located in a concave portion provided on the other holding mechanism, and part of the other holding mechanism is located in the concave portion provided on the one holding mechanism,
    wherein each of the two holding mechanisms includes a spring configured to generate a biasing force for holding the third lens unit, and
    wherein the part of each holding mechanism includes the spring and a hook to which the spring is hooked.

2. The stereo lens apparatus according to claim 1, wherein in each of the two holding mechanisms, a portion at a position where the two holding mechanisms are adjacent to each other has a smaller thickness in a direction orthogonal to an optical axis of the third lens unit than a portion at a position where the two holding mechanisms are not adjacent to each other, and
    wherein in each of the two holding mechanisms, the part of the holding mechanism and the concave portion are provided on the portion at the position where the two holding mechanisms are adjacent to each other.

3. The stereo lens apparatus according to claim 1, wherein each of the two holding mechanisms includes an adjusting mechanism configured to perform optical adjustment of the third lens unit.

4. The stereo lens apparatus according to claim 3, wherein the adjusting mechanism includes a plurality of decentering rollers for optical adjustment of the third lens unit, and
    wherein the plurality of decentering rollers are disposed on a portion that is not a portion at a position where the two holding mechanisms are adjacent to each other.

5. The stereo lens apparatus according to claim 1, wherein the stereo lens apparatus includes a mount detachably attachable to an image pickup apparatus,
    wherein the inter-optical axis distance between the two third lens units is smaller than an inner diameter of the mount, and
    wherein the inter-optical axis distance between the two first lens units is larger than the inner diameter of the mount.

6. An image pickup apparatus to which a stereo lens apparatus including two optical systems arranged in parallel is detachably attachable, the image pickup apparatus comprising a single image sensor configured to capture two optical images formed by the two optical systems, wherein each of the two optical systems includes, in order from an object side to an image side, a first lens unit, a second lens unit, and a third lens unit, wherein an optical path is bent at a position between the first lens unit and the second lens unit and at a position between the second lens unit and the third lens unit in each of the two optical systems so that an inter-optical axis distance between two third lens units of the two optical systems is narrower than an inter-optical axis distance between two first lens units of the two optical systems, wherein part of one holding mechanism of two holding mechanisms that are configured to respectively hold the two third lens units is located in a concave portion provided on the other holding mechanism, and part of the other holding mechanism is located in the concave portion provided on the one holding mechanism, wherein each of the two holding mechanisms includes a spring configured to generate a biasing force for holding the third lens unit, and wherein the part of each holding mechanism includes the spring and a hook to which the spring is hooked.

7. A stereo image pickup apparatus comprising a stereo lens apparatus including two optical systems arranged in parallel, wherein each of the two optical systems includes, in order from an object side to an image side, a first lens unit, a second lens unit, and a third lens unit, wherein an optical path is bent at a position between the first lens unit and the second lens unit and at a position between the second lens unit and the third lens unit in each of the two optical systems so that an inter-optical axis distance between two third lens units of the two optical systems is narrower than an inter-optical axis distance between two first lens units of the two optical systems, wherein part of one holding mechanism of two holding mechanisms that are configured to respectively hold the two third lens units is located in a concave portion provided on the other holding mechanism, and part of the other holding mechanism is located in the concave portion provided on the one holding mechanism, wherein each of the two holding mechanisms includes a spring configured to generate a biasing force for holding the third lens unit, and wherein the part of each holding mechanism includes the spring and a hook to which the spring is hooked.

\* \* \* \* \*